US012482328B2

(12) United States Patent
Higgins et al.

(10) Patent No.: US 12,482,328 B2
(45) Date of Patent: *Nov. 25, 2025

(54) SYSTEM AND METHOD FOR SYNCHRONIZING CASHLESS WAGERING ACCOUNTS AND GAMING ESTABLISHMENT RETAIL ACCOUNTS

(71) Applicant: IGT, Las Vegas, NV (US)

(72) Inventors: Kevin Higgins, Reno, NV (US); Jeffery Shepherd, Reno, NV (US)

(73) Assignee: IGT, Las Vegas, NV (US)

( * ) Notice: Subject to any disclaimer, the term of this patent is extended or adjusted under 35 U.S.C. 154(b) by 44 days.

This patent is subject to a terminal disclaimer.

(21) Appl. No.: 18/415,287

(22) Filed: Jan. 17, 2024

(65) Prior Publication Data

US 2024/0153339 A1 May 9, 2024

Related U.S. Application Data

(60) Continuation of application No. 17/730,932, filed on Apr. 27, 2022, now Pat. No. 11,915,549, which is a continuation of application No. 17/073,789, filed on Oct. 19, 2020, now Pat. No. 11,341,808, which is a division of application No. 16/057,437, filed on Aug. 7, 2018, now Pat. No. 10,810,835.

(60) Provisional application No. 62/564,622, filed on Sep. 28, 2017.

(51) Int. Cl.
*G07F 17/32* (2006.01)
*G07F 17/34* (2006.01)

(52) U.S. Cl.
CPC ...... *G07F 17/3225* (2013.01); *G07F 17/3288* (2013.01); *G07F 17/329* (2013.01); *G07F 17/3293* (2013.01); *G07F 17/34* (2013.01)

(58) Field of Classification Search
CPC ............ G07F 17/3225; G07F 17/3288; G07F 17/329; G07F 17/3293; G07F 17/34
See application file for complete search history.

(56) References Cited

U.S. PATENT DOCUMENTS

| | | | |
|---|---|---|---|
| 6,378,775 | B2 | 4/2002 | Hayashida |
| 7,268,667 | B2 | 9/2007 | Beenau et al. |
| 8,308,554 | B2 | 11/2012 | Rowe et al. |
| 8,423,475 | B2 | 4/2013 | Bishop et al. |
| 8,452,687 | B2 | 5/2013 | Rowe |
| 9,245,410 | B2 | 1/2016 | Anderson et al. |
| 9,613,491 | B2 | 4/2017 | Roth |
| 11,164,420 | B2 | 11/2021 | Shepherd et al. |
| 2005/0054439 | A1 | 3/2005 | Rowe et al. |
| 2009/0005159 | A1 | 1/2009 | Netley et al. |
| 2011/0118008 | A1 | 5/2011 | Taylor |
| 2012/0190433 | A1 | 7/2012 | Rowe |
| 2013/0225282 | A1 | 8/2013 | Williams et al. |
| 2016/0035175 | A1 | 2/2016 | Kelly |
| 2017/0092054 | A1 | 3/2017 | Petersen et al. |

OTHER PUBLICATIONS

Australian Examination Report No. 1 for Application No. 2018220121 dated Jun. 29, 2023 (4 pages).

*Primary Examiner* — Kevin Y Kim
(74) *Attorney, Agent, or Firm* — Neal, Gerber & Eisenberg LLP

(57) ABSTRACT

A system that synchronizes data between multiple accounts associated with a gaming establishment.

20 Claims, 9 Drawing Sheets

1000

SYSTEM AND METHOD FOR SYNCHRONIZING CASHLESS WAGERING ACCOUNTS AND GAMING ESTABLISHMENT RETAIL ACCOUNTS

PRIORITY CLAIM

This application is a continuation of, claims priority to and the benefit of U.S. patent application Ser. No. 17/730,932, filed on Apr. 27, 2022, which is a continuation of, claims priority to and the benefit of U.S. patent application Ser. No. 17/073,789, filed on Oct. 19, 2020, which is a divisional of, claims priority to and the benefit of U.S. patent application Ser. No. 16/057,437, filed on Aug. 7, 2018, which claims priority to and the benefit of U.S. Patent Application No. 62/564,622, filed on Sep. 28, 2017, the entire contents of which are each incorporated by reference herein.

BACKGROUND

Gaming machines may provide players awards in primary games. Gaming machines generally require the player to place a wager to activate the primary game. The award may be based on the player obtaining a winning symbol or symbol combination and on the amount of the wager. Generally, symbols or symbol combinations which are less likely to occur provide higher awards.

BRIEF SUMMARY

In various embodiments, the system disclosed herein utilizes an application running on a mobile device to facilitate the transfer of funds amongst one or more cashless wagering accounts associated with or otherwise maintained for a player, one or more separate gaming establishment retail accounts also associated with or otherwise maintained for the player and/or one or more external accounts associated with or otherwise maintained for the player. In these embodiments, following the funding of a cashless wagering account, the system enables the player to utilize an application running on a mobile device (and without utilizing any physical forms of currency or physical ticket vouchers associated with any forms of currency) to transfer funds from the cashless wagering account to establish a credit balance for game play on an electronic gaming machine ("EGM") and/or to fund other wagering opportunities (e.g., placing a wager on a sporting event either at or remote from an EGM). Additionally, in these embodiments, following the funding of a gaming establishment retail account, the system enables the player to utilize an application running on a mobile device (and without utilizing any physical forms of currency or physical ticket vouchers associated with any forms of currency) and the funded gaming establishment retail account to pay for various purchases within or otherwise associated with the gaming establishment and/or for a quantity of non-cashable credits (which are playable on an EGM, but not otherwise directly redeemable for cash). As such and in view of the various funding options, transfer options and spending options associated with the various accounts associated with or otherwise maintained by the different components within this eco-system, the system periodically synchronizes the different account including the different states and limits associated with these various accounts. That is, since different accounts may be periodically created or otherwise added to the eco-system and since different accounts may have different states (e.g., a locked state versus an unlocked state) and/or different limits (e.g., monetary limits on a total amount of withdrawals in a designated period of time), the system disclosed herein enables one, more or each of the components to synchronize these accounts, states and limits to ensure that such accounts (individually and/or collectively) remain within the confines of the various states and limits. Accordingly, the system disclosed herein provides that the accounts and characteristics, parameters or attributes of these accounts are synchronized across the various disparate, but interconnected components of the system (which may extend across different sites and/or gaming vertical boundaries). This synchronization further fosters the use of mobile devices to facilitate fund transfers and thus overcomes various security concerns and labor cost concerns associated with both cash-based gaming and ticket voucher-based gaming Such a configuration further reduces the use of paper ticket vouchers (and any ink associated with the production of such paper ticket vouchers) to reduce the amount of waste produced by gaming establishments. Such a reduction in the amount of waste produced by gaming establishments provides an environmental benefit of implementing the system disclosed herein.

In certain embodiments, the present disclosure relates to a system including a processor, and a memory device which stores a plurality of instructions, which when executed by the processor, cause the processor to receive data associated with a requested amount of funds to be electronically transferred from a first gaming establishment account, wherein the first gaming establishment account is accessible via a mobile device application of a mobile device. When executed by the processor responsive to the first gaming establishment account and a second gaming establishment account linked to the first gaming establishment account being in compliance with a parameter of the first gaming establishment account and the second gaming establishment account linked to the first gaming establishment account, the instructions cause the processor to communicate, to a gaming establishment component which maintains the second gaming establishment account, fund transfer data associated with the requested amount of funds, wherein after the communication of the fund transfer data, the requested amount of funds are accessible via the mobile device application of the mobile device.

In certain embodiments, the present disclosure relates to a system including a processor, and a memory device which stores a plurality of instructions, which when executed by the processor, cause the processor to receive, from a gaming establishment component, a request to conduct a transaction associated with a gaming establishment enterprise account accessible via a mobile device application of a mobile device. When executed by the processor responsive to the gaming establishment enterprise account not being linked to the gaming establishment component, the instructions cause the processor to create a gaming establishment account associated with the gaming establishment component, link the created gaming establishment account with the gaming establishment enterprise account, and permit access of the created gaming establishment account via the mobile device application of the mobile device.

In certain embodiments, the present disclosure relates to a system including a processor, and a memory device which stores a plurality of instructions, which when executed by the processor, cause the processor to store first data associated with a first gaming establishment account and a first parameter of the first gaming establishment account, wherein the stored first data has a first timestamp and the first gaming establishment account is accessible via a mobile device application of a mobile device. When executed by the processor, the instructions cause the processor to receive second data from a first gaming establishment component which maintains the first gaming establishment account, the second data associated with the first gaming establishment account and a second parameter of the first gaming establishment account, wherein the second data has a second timestamp. When executed by the processor responsive to the second timestamp being later than the first timestamp, the instructions cause the processor to synchronize, based on the received second data, the stored first data with the received second data.

Additional features are described herein, and will be apparent from the following Detailed Description and the figures.

DETAILED DESCRIPTION

Figure 1A:
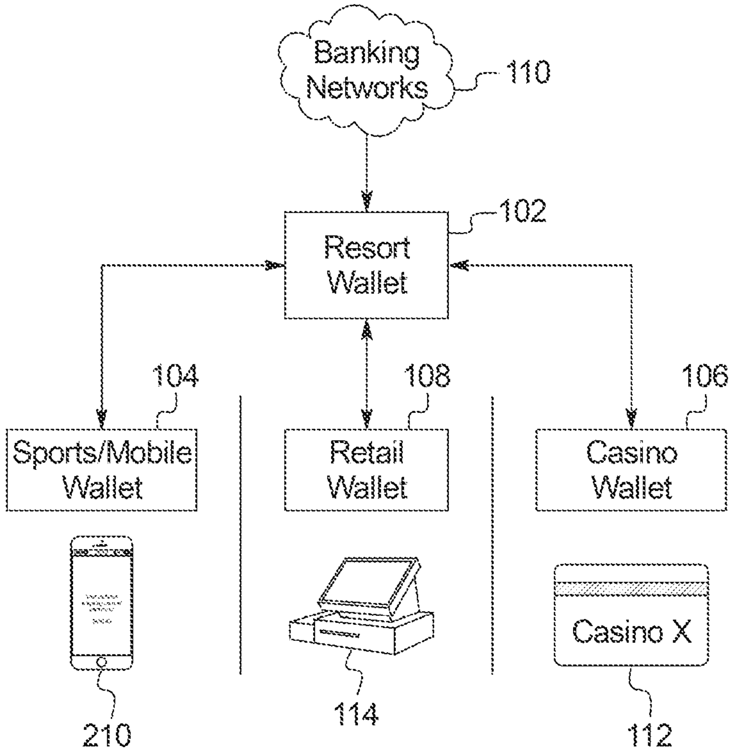
FIG. 1A is an example configuration of the architecture of a plurality of different components of the system disclosed herein.

In various embodiments, the system disclosed herein utilizes an application running on a mobile device to facilitate the transfer of funds amongst one or more cashless wagering accounts associated with or otherwise maintained for a player, one or more separate gaming establishment retail accounts also associated with or otherwise maintained for the player and/or one or more external accounts associated with or otherwise maintained for the player. In these embodiments, following the funding of a cashless wagering account, the system enables the player to utilize an application running on a mobile device (and without utilizing any physical forms of currency or physical ticket vouchers associated with any forms of currency) to transfer funds from the cashless wagering account to establish a credit balance for game play on an electronic gaming machine ("EGM") and/or to fund other wagering opportunities (e.g., placing a wager on a sporting event either at or remote from an EGM). Additionally, in these embodiments, following the funding of a gaming establishment retail account, the system enables the player to utilize an application running on a mobile device (and without utilizing any physical forms of currency or physical ticket vouchers associated with any forms of currency) and the funded gaming establishment retail account to pay for various purchases within or otherwise associated with the gaming establishment and/or for a quantity of non-cashable credits (which are playable on an EGM, but not otherwise directly redeemable for cash). As such and in view of the various funding options, transfer options and spending options associated with the various accounts associated with or otherwise maintained by the different components within this eco-system, the system periodically synchronizes the different account including the different states and limits associated with these various accounts. That is, since different accounts may be periodically created or otherwise added to the eco-system and since different accounts may have different states (e.g., a locked state versus an unlocked state) and/or different limits (e.g., monetary limits on a total amount of withdrawals in a designated period of time), the system disclosed herein enables one, more or each of the components to synchronize these accounts, states and limits to ensure that such accounts (individually and/or collectively) remain within the confines of the various states and limits. Accordingly, the system disclosed herein provides that the accounts and characteristics, parameters or attributes of these accounts are synchronized across the various disparate, but interconnected components of the system (which may extend across different sites and/or gaming vertical boundaries). This synchronization further fosters the use of mobile devices to facilitate fund transfers and thus overcomes various security concerns and labor cost concerns associated with both cash-based gaming and ticket voucher-based gaming Such a configuration further reduces the use of paper ticket vouchers (and any ink associated with the production of such paper ticket vouchers) to reduce the amount of waste produced by gaming establishments. Such a reduction in the amount of waste produced by gaming establishments provides an environmental benefit of implementing the system disclosed herein.

System Accounts

In various embodiments, the system disclosed herein includes various components or sub-systems which are each associated with or otherwise maintain one or more accounts and which are configured to communicate with one another. In these embodiments, the various accounts maintained for a user collectively form a resort or enterprise account for the user. That is, the collection of cashless wagering accounts (i.e., cashless wagering wallets) and gaming establishment retail accounts (i.e., gaming establishment retail wallets) associated with or otherwise maintained for a player or user collectively form a resort or enterprise account (i.e., a integrated resort wallet) which the player or user may access to transfer funds and/or view balance information amongst the various accounts associated with or otherwise maintained for the player or user.

In various embodiments, the system includes one or more cashless wagering systems which are each associated with or otherwise maintain one or more cashless wagering accounts. In certain embodiments, the system includes a first cashless wagering system which maintains a first cashless wagering account, wherein a player utilizes a mobile device application running on a mobile device to facilitate the electronic transfer of any funds between this first cashless wagering account and an electronic gaming machine ("EGM"). For example, as seen in FIG. 1A, a resort wallet 102 or enterprise wallet includes or is otherwise in communication with a Sports/Mobile Wallet 104 (i.e., a first cashless wagering account maintained by a first cashless wagering system) accessible via a mobile device 210 running a mobile device application as described herein.

In certain embodiments, the system additionally or alternatively includes a second cashless wagering system which maintains a second cashless wagering account associated with a physical instrument, such as a player issued magnetic striped card. In these embodiments, a player utilizes the physical instrument (e.g., via inserting the card into a player tracking unit associated with an EGM) to facilitate the electronic transfer of any funds between this second cashless wagering account and the EGM. Continuing with the example, as seen in FIG. 1A, the resort wallet 102 or enterprise wallet also includes or is otherwise in communication with a Casino Wallet 106 (i.e., a second cashless wagering account maintained by a second cashless wagering system) accessible via a physical instrument, such as a player issued magnetic striped card associated with the second cashless wagering system 112 or a mobile device associated with the second cashless wagering system.

In various embodiments, in addition to or an alternative of maintaining one or more cashless wagering accounts via one or more cashless wagering systems, the system includes one or more gaming establishment retail systems which each maintain one or more gaming establishment retail accounts. Such a gaming establishment retail account (i.e., a gaming establishment retail wallet) of a gaming establishment retail system integrates with various retail point-of-sale systems throughout the gaming establishment to enable players to purchase goods and/or services via the player's gaming establishment retail account. Continuing with this example, as seen in FIG. 1A, the resort wallet 102 or enterprise wallet further includes or is otherwise in communication with a Retail Wallet 108 (i.e., a gaming establishment retail account maintained by a gaming establishment retail system) accessible via a point-of-sale terminal 114 associated with a gaming establishment.

Funding Gaming Establishment Retail Account

In various embodiments, prior to utilizing a mobile device to facilitate the use or transfer of any funds from a gaming establishment retail account, an amount of funds must first be established or otherwise deposited in a gaming establishment retail account.

In various embodiments, a gaming establishment retail account is part of a gaming establishment retail system. In these embodiments, the gaming establishment retail account is a retail account with a balance or a pre-paid access account which, per current regulations from the U.S. Treasury Department Financial Crimes Enforcement Network ("FinCEN"), cannot be convertible to cash and can only be used for the purchase of goods and/or services. Such a gaming establishment retail account (i.e., a gaming establishment retail wallet) of a gaming establishment retail system integrates with various retail point-of-sale systems throughout the gaming establishment to enable players/users to purchase goods and/or services via the player's gaming establishment retail account. It should be appreciated that once an amount of funds are deposited in a gaming establishment retail account, certain regulations dictate that such funds cannot be converted back to cashable funds. That is, while an amount of funds deposited in a gaming establishment retail account may be used with various retail point-of-sale systems throughout the gaming establishment to enable players/users to purchase goods and/or services (and, as described herein, be used to fund a cashless wagering account with an amount of non-cashable credits), such funds deposited in the gaming establishment retail account cannot be converted to cash.

In certain embodiments, the creation of a gaming establishment retail account occurs via the system enabling a user or player to enroll in such a gaming establishment retail account. In one such embodiment, the system enables a user or player to enroll or otherwise sign up for a gaming establishment retail account via the user picking up a retail account card at various locations, such as shops, throughout the gaming establishment. In another such embodiment, the system enables a user or player to electronically enroll or otherwise sign up for a gaming establishment retail account via a mobile application running on a mobile device, a point-of-sale terminal, an EGM and/or a kiosk. In another such embodiment, the system enables a user or player to enroll or otherwise sign up for a gaming establishment retail account by adding a retail account to their existing player tracking account.

In certain embodiments, the creation of a gaming establishment retail account occurs via the user attempting to use an amount of funds associated with the user (i.e., funds associated with the user's resort wallet or enterprise wallet) at a site which was not previously associated with the user's resort wallet or enterprise wallet. In these embodiments, upon the requested use of the funds of the user's resort wallet from a component of the system not otherwise linked to or associated with the user's resort wallet, the system will create a gaming establishment retail account associated with the requesting component of the system. For example, if a user attempts to use funds from their resort wallet at a gaming establishment retail location not previously linked to the user's resort wallet, the system will create a gaming establishment retail account for the gaming establishment retail location and associate the created gaming establishment retail account with the user's existing resort wallet. Such dynamic account creation provides users or players enhanced ease of use as they can seamlessly use their existing resort wallet at various new sites or locations within or otherwise associated with one or more gaming establishments.

In certain embodiments, a gaming establishment retail account is associated with a third-party account, such as one or more credit card accounts, one or more debit card accounts and/or one or more third-party maintained accounts (e.g., one or more PayPal® accounts or Venmo® accounts), from which funds are drawn from to fund the gaming establishment retail account. In certain embodiments, the gaming establishment retail account is associated with a gaming establishment or a group of gaming establishments, wherein the system enables the player to establish a gaming establishment retail account by a deposit of funds (such as at a kiosk). In other embodiments, the system funds the gaming establishment retail account via a mobile device electronic fund transfer, such using Apple Pay™ or Android Pay™. In various embodiments, the system utilizes a mobile device running a mobile device application, a kiosk, an EGM and/or a gaming establishment interface to facilitate this transfer of funds from a third-party account.

In certain embodiments, the system enables funds to be deposited in a gaming establishment retail account via drawing funds from a gaming establishment credit system which issues the player a line of credit or marker. In certain other embodiments, the system includes one or more gaming establishment fund management systems which are each associated with or otherwise maintain one or more gaming establishment fund management accounts for a player. In these embodiments, the gaming establishment fund management system (which maintains a gaming establishment fund management account for a player) is in communication with one or more credit systems which each issue the player one or more lines of credit or markers, wherein prior to the funds drawn from the line of credit being transferred to a gaming establishment retail account, such funds must first be transferred to or otherwise established in the gaming establishment fund management account via one or more lines of credits. In various embodiments, the system utilizes a mobile device running a mobile device application, a kiosk, an EGM and/or a gaming establishment interface to facilitate these transfer(s) of funds from the gaming establishment credit system.

In certain embodiments, the system enables funds to be deposited in a gaming establishment retail account via an EGM. In certain embodiments, the system enables a player that has an amount of cash to utilize an EGM to convert the cash to an amount deposited into a gaming establishment retail account (which is subsequently utilized to purchase goods and/or services at the gaming establishment and/or transferred to a cashless wagering account as non-cashable credits for a subsequent transfer to an EGM utilizing a mobile device application). In other embodiments, the system enables funds to be deposited in a gaming establishment retail account via an EGM that accepts printed ticket vouchers (i.e., a bearer instrument redeemable for cash or game play on the EGM). In these embodiments, the system enables a player that has one or more printed ticket vouchers to utilize an EGM to convert the printed ticket voucher to an amount deposited into a gaming establishment retail account (which is subsequently utilized to purchase goods and/or services at the gaming establishment and/or transferred to a cashless wagering account as non-cashable credits for a subsequent transfer to an EGM utilizing a mobile device application).

In certain embodiments, the system enables funds to be deposited in a gaming establishment retail account via a gaming establishment interface, such as a casino desk. In certain embodiments, the system enables a player that has an amount of cash to utilize a gaming establishment interface, such as a casino desk to convert the cash to an amount deposited into a gaming establishment retail account (which is subsequently utilized to purchase goods and/or services at the gaming establishment and/or transferred to a cashless wagering account as non-cashable credits for a subsequent transfer to an EGM utilizing a mobile device application). In other embodiments, the system enables funds to be deposited in a gaming establishment retail account via a gaming establishment interface that accepts printed ticket vouchers. In these embodiments, the system enables a player that has one or more printed ticket vouchers to utilize a gaming establishment interface to convert the printed ticket voucher to an amount deposited into a gaming establishment retail account (which is subsequently utilized to purchase goods and/or services at the gaming establishment and/or transferred to a cashless wagering account as non-cashable credits for a subsequent transfer to an EGM utilizing a mobile device application).

In certain embodiments, the system enables funds to be deposited in a gaming establishment retail account via a kiosk that accepts money. In certain embodiments, the system enables a player that has an amount of cash to utilize a kiosk to convert the cash to an amount deposited into a gaming establishment retail account (which is subsequently utilized to purchase goods and/or services at the gaming establishment and/or transferred to a cashless wagering account as non-cashable credits for a subsequent transfer to an EGM utilizing a mobile device application). In other embodiments, the system enables funds to be deposited in a gaming establishment retail account via a kiosk that accepts printed ticket vouchers. In these embodiments, the system enables a player that has one or more printed ticket vouchers to utilize a kiosk to convert the printed ticket voucher to an amount deposited into a gaming establishment retail account (which is subsequently utilized to purchase goods and/or services at the gaming establishment and/or transferred to a cashless wagering account as non-cashable credits for a subsequent transfer to an EGM utilizing a mobile device application).

In certain embodiments, the gaming establishment retail account is associated with funds associated with one or more virtual ticket vouchers. In certain embodiments, the system enables a player associated with an amount of virtual ticket vouchers (as described in more detail below) to utilize an EGM, a mobile device running an application, a kiosk and/or a gaming establishment interface to convert the virtual ticket vouchers to an amount deposited into a gaming establishment retail account. Detailed examples of virtual ticket vouchers and wireless communication protocols associated with such virtual ticket vouchers are described in: (i) U.S. Published Patent Application No. 2013/0023339, entitled "METHODS AND APPARATUS FOR PROVIDING SECURE LOGON TO A GAMING MACHINE USING A MOBILE DEVICE"; (ii) U.S. Published Patent Application No. 2014/0162768, entitled "METHODS AND APPARATUS FOR PROVIDING SECURE LOGON TO A GAMING MACHINE USING A MOBILE DEVICE"; (iii) U.S. Pat. No. 8,956,222, entitled "MOBILE DEVICE INTERFACES AT AN ELECTRONIC GAMING MACHINE"; (iv) U.S. Published Patent Application No. 2013/0260889, entitled "EMAILING OR TEXTING AS COMMUNICATION BETWEEN MOBILE DEVICE AND EGM"; (v) U.S. Published Patent Application No. 2013/0065668, entitled "Redemption of virtual tickets using a portable electronic device"; (vi) U.S. Patent No. 2014/0121005, entitled "VIRTUAL TICKET-IN AND TICKET-OUT ON A GAMING MACHINE"; (vii) U.S. Published Patent Application No. 2013/0065678, entitled "RETROFIT DEVICES FOR PROVIDING VIRTUAL TICKET-IN AND TICKET-OUT ON A GAMING MACHINE"; (viii) U. S. Published Patent Application No. 2013/0065686, entitled "Bill acceptors and printers for providing virtual ticket-in and ticket-out on a gaming machine"; (ix) U.S. Pat. No. 8,961,306, entitled "FEEDBACK TO PLAYER OF DEVICE CONNECTION STATE"; (x) U.S. Pat. No. 8,613,668, entitled "DIRECTIONAL WIRELESS COMMUNICATION"; (xi) U.S. Published Patent Application No. 2013/0316808, entitled "METHOD AND APPARATUS FOR ENTERING SENSITIVE DATA FOR AN ELECTRONIC GAMING MACHINE FROM A PORTABLE ELECTRONIC DEVICE"; (xii) U.S. Pat. No. 8,622,836, entitled "USE OF WIRELESS SIGNAL STRENGTH TO DETERMINE CONNECTION"; and (xiii) U.S. Published Patent Application No. 2014/0248941, entitled "TRANSFER VERIFICATION OF MOBILE PAYMENTS".

In certain embodiments, the system enables a player to fund the gaming establishment retail account independent of the mobile device and independent of the mobile device application. In certain other embodiments, the system enables a player to utilize a mobile device running a mobile device application to fund the gaming establishment retail account. More specifically and utilizing the example of a kiosk, in one embodiment, to utilize a mobile device and a kiosk to facilitate the funding of a gaming establishment retail account, the player wirelessly pairs or otherwise connects a mobile device with a kiosk. In one example embodiment, the player moves the mobile device into the range of a wireless receiver of the kiosk. The kiosk and the launched or activated mobile device application of the mobile device negotiate a secure, authenticated connection with the proper functionality, versions and security settings.

It should be appreciated that the kiosk wirelessly connects with the mobile device running the mobile device application in the same or similar fashion to how a mobile device is paired or connected with an EGM as described herein.

After connecting the mobile device to the kiosk, the kiosk prompts the player to deposit an amount of funds into the kiosk. In one such embodiment, the kiosk prompts the player to insert one or more bills into a bill acceptor of the kiosk. In another such embodiment, the kiosk additionally or alternatively prompts the player to deposit a physical ticket voucher (associated with an amount of funds) into the kiosk. In another such embodiment, the kiosk additionally or alternatively prompts the player to deposit a card associated with an external account, such as a credit card or debit card into the kiosk. In another such embodiment, the kiosk additionally or alternatively prompts the player to enter information associated with an external account, such as a credit card account, a PayPal® account, a Venmo® account, or a debit card account into the kiosk. In another such embodiment, the kiosk additionally or alternatively prompts the player to deposit an amount of funds into the kiosk using a mobile device electronic fund transfer, such using Apple Pay™ or Android Pay™.

In one embodiment, after a first amount of funds is accepted, such as after a first bill or unit of currency is accepted, by the kiosk, the kiosk and/or the mobile device application enable the player to transfer the deposited amount of funds (e.g., a "Load Phone Now" button) or continue to deposit additional amounts of funds with the kiosk. In certain embodiments, upon receiving an amount of funds from the player and the player indicating to transfer the deposited amount of funds in association with the mobile device application, the kiosk communicates with one or more servers, such as a gaming establishment retail server, to transfer an amount of money to a gaming establishment retail account (to be subsequently utilized to purchase goods and/or services at the gaming establishment and/or transferred to a cashless wagering account as non-cashable credits for a subsequent transfer to an EGM utilizing a mobile device application).

It should be appreciated that while the above example embodiments are described in relation to utilizing a mobile device to facilitate the transferring one or more amounts of money or units of currency from a kiosk to a gaming establishment retail account, such example embodiments may also be used to transfer, either as an isolated transaction or as part of an operation mode of the EGM, one or more amounts of money or units of currency from an EGM to a gaming establishment retail account and/or from a gaming establishment interface, such as a casino desk, to a gaming establishment retail account.

In certain embodiments, in addition to utilizing the mobile device to facilitate the transfer of funds from a gaming establishment retail account to a cashless wagering account as disclosed below, the system utilizes a mobile device to facilitate the transfer of funds from a cashless wagering account to a gaming establishment retail account. In these embodiments, the transfer of funds from the cashless wagering account to the gaming establishment retail account occurs via one or more applications being run or executed on the mobile device. That is, in addition to the below-described actions (e.g., utilizing the mobile device application to facilitate the transfer of funds from the cashless wagering account to the EGM), to be performed which may be selected via the mobile device application, the mobile device application enables the player to request that an amount of funds be transferred from the cashless wagering account to the gaming establishment retail account.

It should be appreciated that in various embodiments the system limits the transfer of funds from a cashless wagering account to a gaming establishment retail account to funds that can be redeemed for cash, such as cashable credits and/or non-restricted promotional credits. That is, to prevent a player from improperly converting non-cashable credits held in a cashless wagering account to products and/or services, the system enables the player to utilize cashable credits (i.e., credits that can be directly converted to cash) to load funds from their cashless wagering account to their gaming establishment retail account (which are then usable for goods and/or services, but not otherwise redeemable for cash). In certain embodiments, this configuration provides just-in-time funding of the gaming establishment retail account to enable the player to make purchases at different point-of-sale locations associated with the gaming establishment retail network. It should be appreciated that to remain in compliance with such limits associated with these gaming establishment retail accounts, as described in detail below, the system periodically synchronizes the various accounts maintained by the various system components such that each system component is aware of (and thus can comply with) these limits.

Following the player's decision to transfer an amount of funds (in the form of cashable credits) from a cashless wagering account to a gaming establishment retail account, the cashless wagering system determines whether to authorize the transfer of the determined amount of funds. If the cashless wagering system determines not to authorize the determined amount of funds, the cashless wagering system communicates a denial to the mobile device application, wherein the mobile device application displays a denial of fund transfer to the player.

On the other hand, if the cashless wagering system determines to authorize the determined amount of funds, the cashless wagering system updates the cashless wagering account associated with the player (to reflect a reduction of the determined amount of cashable funds) and communicates an authorization to the gaming establishment retail system. The gaming establishment retail system then increases a balance of available funds of the gaming establishment retail account by the transferred amount of funds. The mobile device application proceeds with displaying an updated gaming establishment retail account balance as well as an updated cashless wagering account balance.

In certain embodiments, the system includes an automatic reload feature wherein if a gaming establishment retail account falls below a threshold level, the system automatically transfers an amount from the external account, the cashless wagering account and/or the gaming establishment account to the gaming establishment retail account. It should be appreciated that, in certain embodiments, the system enables the player to enable or disable such an automatic reload feature.

In operation, following the above-described establishment of a gaming establishment retail account and the above-described funding of the gaming establishment retail account, the player presents a retail wallet identity (i.e., a physical card associated with the gaming establishment retail account or a mobile device running a mobile device application associated with the gaming establishment retail account) at an applicable terminal of the point-of-sale system within or otherwise associated with the gaming establishment for the purchase of goods and/or services. The point-of-sale system then communicates with the gaming establishment retail wallet system to confirm that the gaming establishment retail account has adequate funds for the intended purchase. If the gaming establishment retail wallet system confirms the presence of adequate funds in the gaming establishment retail account, the point-of-sale system authorizes the sale of the goods and/or services and communicates data to the gaming establishment retail wallet system to deduct the price of the purchased goods and/or services from the gaming establishment retail account. On the other hand, if the gaming establishment retail wallet system indicates that the gaming establishment retail account lacks adequate funds for the purchase, the point-of-sale system denies this sale transaction of the goods and/or services using the gaming establishment retail account.

Funding Cashless Wagering Account

In various embodiments, in addition to using the funds in a gaming establishment retail account to purchase goods and/or services at various gaming establishment retail outlets, the system disclosed herein enables a player to transfer an amount of such funds from the gaming establishment retail account to a cashless wagering account.

In certain embodiments, the system utilizes a mobile device to facilitate the transfer of funds from a gaming establishment retail account to a cashless wagering account. In these embodiments, the transfer of funds from a gaming establishment retail account to a cashless wagering account occurs via one or more applications being run or executed on the mobile device.

Figure 1B:
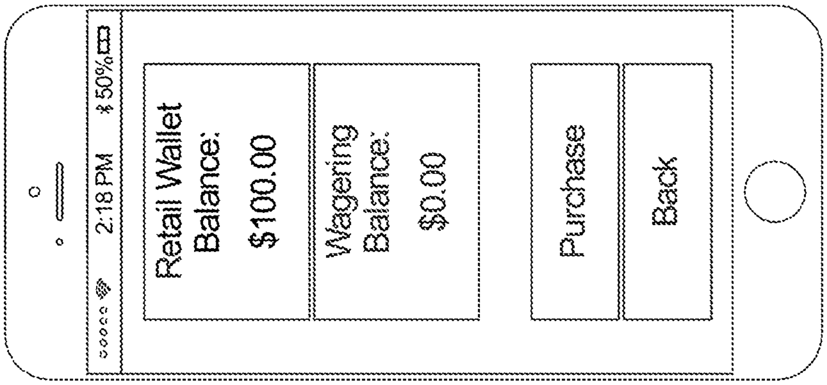
FIGS. 1B, 1C, and 1D are example graphical user interfaces displayed on a mobile device in connection with a transfer of funds from a gaming establishment retail account to a cashless wagering account.

In various embodiments, the mobile device application utilized to transfer funds between a gaming establishment retail account and a cashless wagering account is associated with the gaming establishment retail account and the cashless wagering account, such that the player may view the balances of at least these accounts via the mobile device application. For example, as seen in FIG. 1B, upon launching the application on the mobile device, the mobile device application displays that the player has a $100 in their gaming establishment retail account (i.e., the displayed $100 Retail Wallet Balance) and $0 in their cashless wagering account (i.e., the displayed $0 Wagering Balance).

In certain embodiments, the mobile device application utilized to transfer funds between a gaming establishment retail account and a cashless wagering account is a location based digital wallet enabled application, such as a Passbook-enabled or Wallet-enabled application, which is accessible when the player enters a gaming establishment. In certain embodiments, the mobile device application utilized to transfer funds between a gaming establishment retail account and a cashless wagering account is downloaded to the mobile device from an application store. In certain embodiments, the mobile device application utilized to transfer funds between a gaming establishment retail account and a cashless wagering account is downloaded to the mobile device from one or more websites or application stores affiliated with the gaming establishment (which are accessible directly by the player and/or by a link opened when the player scans a QR code associated with the EGM).

Figure 1C:
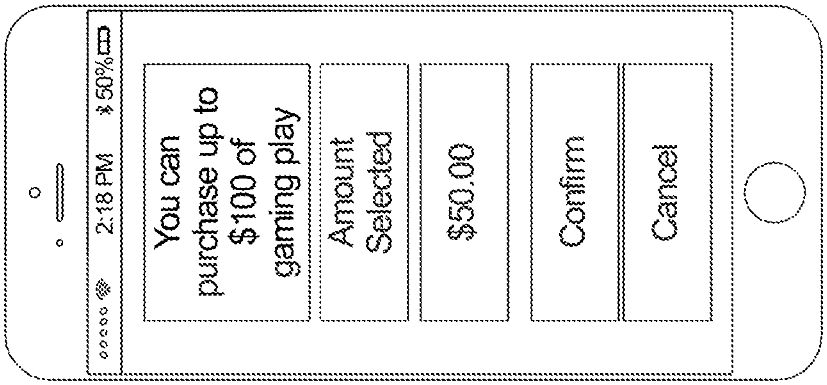

In various embodiments, the mobile device application enables the player to request that an amount of funds be transferred from the gaming establishment retail account to the cashless wagering account. For example, as seen in FIG. 1C, the mobile device application running on the mobile device receives one or more player inputs to request that $50 in their gaming establishment retail account be transferred to their cashless wagering account. As further seen in FIG. 1C, since the gaming establishment retail account currently has a balance of $100, the mobile device application informs the player that they may purchase up to $100 of game play via the transfer of up to $100 from their gaming establishment retail account to their cashless wagering account.

It should be appreciated that since the balance of funds in the gaming establishment retail account cannot be converted to cash, the system transfers any funds from the gaming establishment retail account to the cashless wagering account as non-cashable credits. As described below, such non-cashable credits may be subsequently transferred to the EGM (and usable to play one or more wagering games on the EGM), but such non-cashable credits may not be otherwise directly redeemable for cash (however any winnings from any games played funded by such non-cashable credits are redeemable for cash). In certain scenarios, the conversion of an amount of non-cashable funds from a gaming establishment retail account to an amount of non-cashable credits of a cashless wagering account is effectively providing that an amount of non-cashable funds from a gaming establishment retail account is being used to purchase a quantity of pre-paid plays. In different embodiments, these pre-paid plays are of one or more wagering games of an EGM, one or more placements of one or more sports wagers on one or more sporting events, one or more wagering games of a mobile device and/or one or more table games occurring at a gaming table. It should thus be appreciated that while described herein predominantly as a player placing wagers at an EGM, the present disclosure also applies to wagers placed by the player at a gaming table, such as an electronic gaming table, wagers placed by a player at a gaming terminal associated with one or more gaming tables, wagers placed by a player on a mobile device, wagers placed by a player on one or more sporting events, and/or any applicable wagers placed via any applicable wagering device associated with the system.

Following the player's decision to transfer an amount of funds (in the form of non-cashable credits) from a gaming establishment retail account to a cashless wagering account, the gaming establishment retail system determines whether to authorize the transfer of the determined amount of funds. If the gaming establishment retail system determines not to authorize the determined amount of funds, the gaming establishment retail system communicates a denial to the mobile device application, wherein the mobile device application display a denial of funds transfer to the player.

Figure 1D:
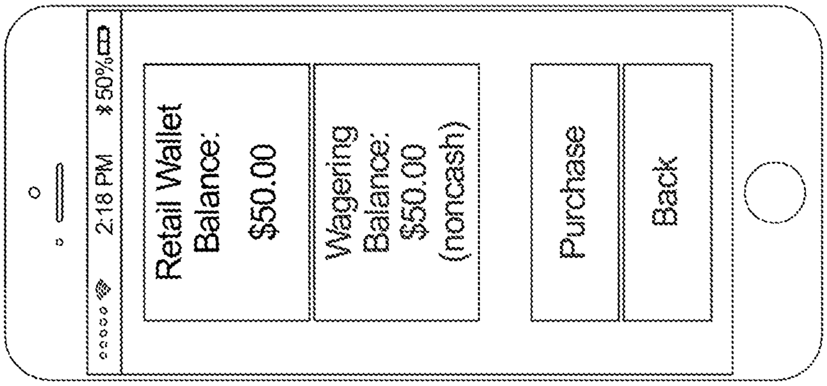

On the other hand, if the gaming establishment retail system determines to authorize the determined amount of funds, the gaming establishment retail system updates the gaming establishment retail account associated with the player (to reflect a reduction of the determined amount of funds) and communicates an authorization to the cashless wagering system. The cashless wagering system increases a balance of non-cashable credits of the cashless wagering account by the transferred amount of funds. The mobile device application proceeds with displaying an updated gaming establishment retail account balance as well as an updated cashless wagering account balance. For example, as seen in FIG. 1D, following the transfer of $50 in non-cashable credits from the gaming establishment retail account to the cashless wagering account, the mobile device application displays that the player has an updated balance of $50 in their gaming establishment retail account (i.e., the displayed $50 Retail Wallet Balance) and $50 in their cashless wagering account (i.e., the displayed $50 Wagering Balance).

Accordingly, the utilization of a mobile device to facilitate the transfer of funds from a gaming establishment retail account to a cashless wagering account provides a player an otherwise uninterrupted gaming experience and thus increases the player's satisfaction with their time spent at the gaming establishment. That is, rather than having to carry cash and/or ticket vouchers (which may be lost or stolen and which, as described below, are associated with various costs to a gaming establishment) between the gaming establishment's retail space and the gaming establishment's gaming space, the system enables a player to simply carry their mobile device which has access to funds to be used in both the gaming establishment's retail space and the gaming establishment's gaming space. Moreover, since certain regulations provide that funds which reside in a cashless wagering account are frozen if wagers are not placed using that cashless wagering account within a sixteen month period, the utilization of a gaming establishment retail account (which do not have the same time-based restrictions) to hold the funds coupled with the seamless, mobile facilitated transfer of such funds from the gaming establishment retail account to the cashless wagering account overcomes certain player's concerns of having their funds frozen due to inactivity.

In certain embodiments, the system includes automatically transferring funds from the gaming establishment retail account to the cashless wagering account utilizing the mobile device application. In one such embodiment, the system includes an automatic reload feature wherein if a cashless wagering account balance falls below a threshold level, the system, including, but not limited to the mobile device, automatically facilitates the transfer an amount of funds (as non-cashable credits) from the gaming establishment retail account to the cashless wagering account. It should be appreciated that, in certain embodiments, the system enables the player to enable or disable such an automatic reload feature.

In certain embodiments, the system provides one or more incentives to a player for utilizing the mobile device facilitated transfer of funds from a gaming establishment retail account to a cashless wagering account. In these embodiments, if a gaming establishment retail account incentive triggering event occurs in association with the mobile device facilitated transfer of funds from a gaming establishment retail account to a cashless wagering account, the system provides one or more incentives to the player, such as a good, a service or a modification to one or more aspects of the player's gaming session. For example, for every $100 of non-cashable credits transferred from a gaming establishment retail account to a cashless wagering account, the system adds $20 of promotional credits (as described below) to the cashless wagering account. Such a configuration encourages the use of the mobile device facilitated transfer of funds from a gaming establishment retail account to a cashless wagering account as described herein.

In certain embodiments, in addition to funding a cashless wagering account with an amount of non-cashable credits drawn from a gaming establishment retail account, the cashless wagering account is also associated with one or more external accounts, such as one or more credit card accounts, one or more debit card accounts and/or one or more third-party maintained accounts (e.g., one or more PayPal® accounts or Venmo® accounts). For example, as seen in FIG. 1A, the resort wallet 102 or enterprise wallet which includes one or more cashless wagering systems which maintain one or more cashless wagering accounts and also includes one or more gaming establishment retail systems which maintain one or more gaming establishment retail accounts is associated with or is otherwise in communication with one or more external financial institutions (i.e., the Banking Network 110).

In certain embodiments, the cashless wagering account is associated with a gaming establishment or a group of gaming establishments, wherein the player establishes a cashless wagering account by a deposit of funds (such as at a kiosk) to be subsequently utilized in association with the mobile device application. In other embodiments, the cashless wagering account is funded via a mobile device electronic fund transfer, such using Apple Pay™ or Android Pay™. In various embodiments, the system utilizes a mobile device running a mobile device application, a kiosk, an EGM and/or a gaming establishment interface to facilitate this transfer of funds from a third-party account.

In certain embodiments, the system enables funds to be deposited in a cashless wagering account via drawing funds from a gaming establishment credit system which issues the player a line of credit or marker. In certain other embodiments, the system includes one or more gaming establishment fund management systems which are each associated with or otherwise maintain one or more gaming establishment fund management accounts for a player. In these embodiments, the gaming establishment fund management system (which maintains a gaming establishment fund management account for a player) is in communication with one or more credit systems which each issue the player one or more lines of credit or markers, wherein prior to the funds drawn from the line of credit being transferred to a cashless wagering account, such funds must first be transferred to or otherwise established in the gaming establishment fund management account via one or more lines of credits. In various embodiments, the system utilizes a mobile device running a mobile device application, a kiosk, an EGM and/or a gaming establishment interface to facilitate these transfer(s) of funds from the gaming establishment credit system.

In certain embodiments, the system enables funds to be deposited in a cashless wagering account via an EGM. In certain embodiments, the system enables a player that has an amount of cash to utilize an EGM to convert the cash to an amount deposited into a cashless wagering account (which may be subsequently transferred back to the EGM utilizing a mobile device application). In other embodiments, the system enables funds to be deposited in a cashless wagering account via an EGM that accepts printed ticket vouchers. In these embodiments, the system enables a player that has one or more printed ticket vouchers to utilize an EGM to convert the printed ticket voucher to an amount deposited into a cashless wagering account (which may be subsequently transferred back to the EGM utilizing a mobile device application).

In certain embodiments, the system enables funds to be deposited in a cashless wagering account via a gaming establishment interface, such as a casino desk. In certain embodiments, the system enables a player that has an amount of cash to utilize a gaming establishment interface, such as a casino desk to convert the cash to an amount deposited into a cashless wagering account (which may be subsequently transferred to an EGM utilizing a mobile device application). In other embodiments, the system enables funds to be deposited in a cashless wagering account via a gaming establishment interface that accepts printed ticket vouchers. In these embodiments, the system enables a player that has one or more printed ticket vouchers to utilize a gaming establishment interface to convert the printed ticket voucher to an amount deposited into a cashless wagering account (which may be subsequently transferred to an EGM utilizing a mobile device application).

In certain embodiments, the system enables funds to be deposited in a cashless wagering account via a kiosk that accepts money. In certain embodiments, the system enables a player that has an amount of cash to utilize a kiosk to convert the cash to an amount deposited into a cashless wagering account (which may be subsequently transferred to an EGM utilizing a mobile device application). In other embodiments, the system enables funds to be deposited in a cashless wagering account via a kiosk that accepts printed ticket vouchers. In certain embodiments, the system enables a player that has one or more printed ticket vouchers to utilize a kiosk to convert the printed ticket voucher to an amount deposited into a cashless wagering account (which may be subsequently transferred to an EGM utilizing a mobile device application).

In certain embodiments, the cashless wagering account is associated with funds associated with one or more virtual ticket vouchers. In certain embodiments, the system enables a player associated with an amount of virtual ticket vouchers to utilize an EGM, a mobile device running a mobile device application, a kiosk and/or a gaming establishment interface to convert the virtual ticket vouchers to an amount deposited into a cashless wagering account.

In certain embodiments, the system enables a player to fund the cashless wagering account independent of the mobile device and independent of the mobile device application. In certain other embodiments, the system enables a player to utilize a mobile device running a mobile device application to fund the cashless wagering account. More specifically and utilizing the example of a kiosk, in one embodiment, to utilize a mobile device and a kiosk to facilitate the funding of a cashless wagering account, the player wirelessly pairs or otherwise connects a mobile device with a kiosk. In one example embodiment, the player moves the mobile device into the range of a wireless receiver of the kiosk. The kiosk and the launched or activated mobile device application of the mobile device negotiate a secure, authenticated connection with the proper functionality, versions and security settings. It should be appreciated that the kiosk wirelessly connects with the mobile device running the mobile device application in the same or similar fashion to how a mobile device is paired or connected with an EGM as described herein.

After connecting the mobile device to the kiosk, the kiosk prompts the player to deposit an amount of funds into the kiosk. In one such embodiment, the kiosk prompts the player to insert one or more bills into a bill acceptor of the kiosk. In another such embodiment, the kiosk additionally or alternatively prompts the player to deposit a physical ticket voucher (associated with an amount of funds) into the kiosk. In another such embodiment, the kiosk additionally or alternatively prompts the player to deposit a card associated with an external account, such as a credit card or debit card into the kiosk. In another such embodiment, the kiosk additionally or alternatively prompts the player to enter information associated with an external account, such as a credit card account, one or more third-party maintained accounts (e.g., one or more PayPal® accounts or Venmo® accounts) or a debit card account into the kiosk. In another such embodiment, the kiosk additionally or alternatively prompts the player to deposit an amount of funds into the kiosk using a mobile device electronic fund transfer, such using Apple Pay™ or Android Pay™.

In one embodiment, after a first amount of funds is accepted, such as after a first bill or unit of currency is accepted, by the kiosk, the kiosk and/or the mobile device application enable the player to transfer the deposited amount of funds (e.g., a "Load Phone Now" button) or continue to deposit additional amounts of funds with the kiosk. In another embodiment, for each amount of funds accepted by the kiosk, such as for each bill or unit of currency accepted by the kiosk, a virtual ticket voucher is created and deposited in the cashless wagering account.

In certain embodiments, upon receiving an amount of funds from the player and the player indicating to transfer the deposited amount of funds in association with the mobile device application, the kiosk communicates with one or more servers, such as a cashless wagering server, to transfer an amount of money to a cashless wagering account (to be drawn upon from the mobile device application as described herein). In another such embodiment, upon receiving an amount of funds from the player and the player indicating to transfer the deposited amount of funds in association with an account or balance associated with the mobile device application, the kiosk communicates with one or more servers, such as a virtual ticket voucher server, to create a virtual ticket voucher associated with the amount of received currency. The system disclosed herein transfers the created virtual ticket voucher to the cashless wagering account.

It should be appreciated that while the above example embodiments are described in relation to utilizing a mobile device to facilitate the transferring one or more amounts of money or units of currency from a kiosk to a cashless wagering account, such example embodiments may also be used to transfer, either as an isolated transaction or as part of an operation mode of the EGM, one or more amounts of money or units of currency from an EGM to a cashless wagering account and/or from a gaming establishment interface, such as a casino desk, to a cashless wagering account.

In certain embodiments, the system includes an automatic reload feature wherein if a cashless wagering account falls below a threshold level, the system automatically transfers an amount from the external account, the gaming establishment retail account and/or the gaming establishment account to the cashless wagering account. It should be appreciated that, in certain embodiments, the system enables the player to enable or disable such an automatic reload feature.

Synchronizing Accounts

In certain embodiments, to comply with one or more applicable jurisdictional standards, the system imposes limits to the amount of funds which may be transferred, utilizing the mobile device application, from the gaming establishment retail account to the cashless wagering account per transaction request. In certain embodiments, the system imposes limits to the amount of funds which may be transferred, utilizing the mobile device application, from the gaming establishment retail account to the cashless wagering account within a designated period of time. In certain embodiments, the system imposes limits to the amount of funds which may be transferred, utilizing the mobile device application, from the gaming establishment retail account to the cashless wagering account for certain activities. In certain embodiments, the system imposes limits to the amount of funds which may be transferred, utilizing the mobile device application, from the gaming establishment retail account to the cashless wagering account utilizing one or more funding sources. It should be appreciated that, in certain embodiments, the system enables the player to enable or disable these system imposed limitations.

In certain embodiments, to comply with one or more applicable jurisdictional standards, the system imposes limits to the amount of funds which may be transferred, utilizing the mobile device application, from the cashless wagering account to the gaming establishment retail account per transaction request. In certain embodiments, the system imposes limits to the amount of funds which may be transferred, utilizing the mobile device application, from the cashless wagering account to the gaming establishment retail account within a designated period of time. In certain embodiments, the system imposes limits to the amount of funds which may be transferred, utilizing the mobile device application, from the cashless wagering account to the gaming establishment retail account for certain activities. In certain embodiments, the system imposes limits to the amount of funds which may be transferred, utilizing the mobile device application, from the cashless wagering account to the gaming establishment retail account utilizing one or more funding sources. It should be appreciated that, in certain embodiments, the system enables the player to enable or disable these system imposed limitations.

In certain embodiments, in view of at least these various limits placed on one or more system accounts and in view of the dynamic way in which additional system accounts may be independently created (and linked to a resort wallet), at designated intervals, such as based on elapsed time or occurrence of one or more events, the system synchronizes the different accounts of the system.

In certain embodiments, the synchronization of the different accounts of the system provides that the collective accounts across the system do not exceed any limits imposed on such accounts individually or such accounts collectively. In these embodiments, since different accounts or collections of accounts may have different limits, such as but not limited to, monetary limits on total withdrawals in a designated period of time, total deposits for a designated period of time, total withdrawals for a single transaction, total deposits for a single transaction, a limit on withdrawals for gaming activities, a limit on deposits made for gaming activities, a limit on withdrawals for non-gaming activities, and a limit on deposits made for non-gaming activities, the system periodically synchronizes various data associated with such different accounts to ensure that no individual account nor collection of accounts violate any of these limits.

In certain embodiments, the synchronization of the different accounts of the system additionally or alternatively provides that the collective accounts across the system do not violate any states associated with such accounts individually or such accounts collectively. In these embodiments, since different accounts or collections of accounts may have different states, such as but not limited to, an enabled or disabled state, a locked or unlocked state, states indicating where funds of an account can be used, and states indicating how funds of an account can be used (used for gaming purposes only, used for non-gaming purposes only or used for gaming purposes or non-gaming purposes), the system periodically synchronizes various data associated with such different accounts to ensure that no individual account nor collection of accounts violate any of these states.

In these embodiments, to synchronize these states and/or limits associated with the various accounts or collections of accounts, the interconnected components of the system each maintains data of the last time the accounts of the system were synchronized.

As the different components of the system are configured to transmit all of the state and limit information between the interconnected components of the system, including an update time for the state and limit data from the sending component, when the state and limit data is received by one of the components of the system, the receiving component will compare the timestamp with its own recorded last synchronized time. If the sending component's update time on the state and limit data is later than the receiving component's stored last synchronized time, the receiving component will update its own state and limit data to ensure that both system components have the most up-to-date state and limit data associated with the various accounts or collections of accounts. In different embodiments, the transmission of state and limit information for one or more of the accounts of the system may be solicited by an interested component of the system or may be communicated unsolicited by one or more of the components. Moreover, in different embodiments, the transmission of state and limit information for one or more of the accounts of the system may be stand-alone messages between the components of the system or may be included with or otherwise piggybacked in other messages between components of the system, such as but not limited to balance inquiry messages and funds transfer messages.

Linking Mobile Device to EGM

In various embodiments, prior to enabling a player to take any action related to an EGM utilizing a mobile device (such as using a mobile device to facilitate a transfer of funds to an EGM), a pairing or linkage occurs between the mobile device and the EGM (or a component of a gaming establishment management system located inside the EGM (i.e., a component of the EGM)). The pairing or linkage between the mobile device and the EGM occurs via one or more applications being run or executed on the mobile device.

In certain embodiments, the mobile device application is the same mobile device application which facilitated one or more of the above-described transfers of funds. In certain other embodiments, the mobile device application is a different mobile device application than the mobile device application which facilitated one or more of the above-described transfers of funds. In certain embodiments, the mobile device application utilized to transfer funds to and from an EGM is a location based digital wallet enabled application, such as a Passbook-enabled or Wallet-enabled application, which is accessible when the player enters a gaming establishment. In certain embodiments, the mobile device application utilized to transfer funds to and from an EGM is downloaded to the mobile device from an application store. In certain embodiments, the mobile device application utilized to transfer funds to and from an EGM is downloaded to the mobile device from one or more websites affiliated with the gaming establishment (which are accessible directly by the player and/or by a link opened when the player scans a QR code associated with the EGM).

In certain embodiments, after a player has opened an application on a mobile device and selected an action to be performed, the system determines if the mobile device application is associated with an active authorization token previously created by the system. In these embodiments, an authorization token is a time-based token which expires after a designated period of time and which is associated with an additional level of player authentication beyond a player's application username and application password.

If the system determines that the application is not associated with an active authorization token previously created by the system, the mobile device application prompts the player to provide identifying information, such as a personal identification number or biometric identifier. The mobile device application stores the provided identifying information as mobile device encrypted data. Following the player providing identifying information, the mobile device application prompts the player to cause the mobile device to engage the EGM (or a component of the EGM), such as prompting the player to tap the mobile device to a designated portion of the EGM. It should be appreciated that any reference herein to a player tapping the mobile device to a designated portion of the EGM (or a component of the EGM) may or may not include the player pressing a fingerprint scanner (if the mobile device is equipped with such a fingerprint scanner) while concurrently engaging the EGM (or a component of the EGM). In other embodiments, the mobile device application verifies the identifying information of the player by communicating with a verification/authentication server over one or more wireless communication protocols, such as WiFi protocol, a cellular communication protocol (e.g., 3G or LTE), to obtain the active authorization token.

In certain embodiments, following the player causing the mobile device to engage the EGM (e.g., the player taps the mobile device to a player tracking card reader or other designated location(s) of the EGM), the mobile device application communicates, via a wireless communication protocol, the provided identifying information and the requested action to be performed to the EGM (or to a component associated with the EGM). For example, upon the player tapping the mobile device to a player tracking card reader or other designated location(s) of the EGM (or otherwise moving the mobile device to within a designated distance of the player tracking card read or other designated locations(s) of the EGM), the mobile device application sends the identifying information and the requested action to a component of a gaming establishment management system located inside the EGM (i.e., a component of the EGM), such as a NexGen® player tracking component of an IGT Advantage® system. NexGen® and IGT Advantage® are trademarks of IGT, the Applicant of the present application.

Following the communication of the identifying information and the requested action to the EGM (or a component associated with the EGM), the system determines if the identifying information is valid. For example, a designated gaming system component configured to operate with a player tracking system determines whether the identifying information is valid.

If the system determines that the identifying information is invalid, the system communicates an invalid identifying information response to the mobile device. For example, an identifying information status message is communicated to the mobile device which reports whether the identifying information is valid or invalid. The mobile device application then displays one or more messages regarding the invalid identifying information and prompts the player to provide identifying information, such as a personal identification number or biometric identifier. In certain such embodiments, if the mobile device receives a communication that the identifying information is invalid (or alternatively in association with the initial creation of a token) and if the mobile device includes a fingerprint scanner, the mobile device application prompts the player to press the fingerprint scanner while engaging the EGM, such as tapping the mobile device to a designated portion of the EGM.

On the other hand, if the system determines that the identifying information is valid, the system creates an authorization token. The system associates the authorization token with a timestamp of when the authorization token will expire. In certain embodiments, a cashless system includes a key distribution center which generates a session key to encrypt all cashless messages. The session key is rotated periodically at a configurable rate from 1 hour to 24 hours. In these embodiments, the system utilizes this session key to sign the token data and create a token. As such, the token time-to-live will be less than or equal to the session key rotation period. In other embodiments, such authorization tokens are managed utilizing software (and not a key distribution center).

In certain embodiments, the authorization token expires after a designated period of time as an additional level of security in the transfer of fund data to/from the EGM which is facilitated the mobile device. Such a designated amount of time which an authorization token remains valid enables the player to move from one EGM to another EGM and, as described below, transfer funds to/from each EGM and a cashless wagering account, without having to reprovide such identifying information each time the player switches EGMs. That is, the mobile device application disclosed herein is configured to communicate with one or more EGMs (without having to reauthenticate itself repeatedly) during the designated amount of time which the authorization token remains valid.

Following the creation of an authorization token, the system communicates the created authorization token to the mobile device, such as via one or more messages including the created authorization token, for storage by the mobile device application and proceeds with executing one or more of the requested actions and communicating a requested action response to the mobile device. For example, upon the creation of the authorization token, the component of a gaming establishment management system located inside the EGM (i.e., a component of the EGM), such as a NexGen® player tracking component of an IGT Advantage® system, communicates the created authorization token to the mobile device and proceeds with executing the requested action.

On the other hand, following a determination that the mobile device application is associated with a previously created and stored authentication token, the mobile device application prompts the player to cause the mobile device to engage the EGM, such as prompting the player to tap the mobile device to a designated portion of the EGM.

Following the player causing the mobile device to engage the EGM (e.g., the player taps the mobile device to a player tracking card reader or other designated location(s) of the EGM), the mobile device application communicates, via a wireless communication protocol, the previously stored authorization token and the requested action to be performed to the EGM (or to a component associated with the EGM). For example, upon the player tapping the mobile device to a player tracking card reader or other designated location(s) of the EGM, the mobile device application sends the stored authorization token and the requested action to a component of a gaming establishment management system located inside the EGM (i.e., a component of the EGM), such as a NexGen® player tracking component of an IGT Advantage® system.

Following the communication of the stored authorization token and the requested action to the EGM or a component associated with the EGM, the system determines if the communicated authorization token is still valid. For example, a gaming system component configured to operate with a player tracking system determines whether the authorization token is valid (i.e., active and non-expired).

If the system determines that the communication authorization token is invalid, the system communicates an invalid authorization token response to the mobile device. The mobile device application then displays one or more messages regarding the invalid authorization token and prompts the player to provide identifying information, such as a personal identification number or biometric identifier, to obtain another authentication token.

On the other hand, if the system determines that the stored authorization token is valid, the system proceeds with executing the requested action. For example, upon the determination that the communicated authorization token is valid, the component of a gaming establishment management system located inside the EGM proceeds with executing the requested action and communicates a requested action response to the mobile device.

In certain embodiments, the system enables a player to interact with the EGM via the mobile device as described herein, without having to continually reengage the EGM with the mobile device for each requested action. In these embodiments, after initially establishing a secure connection with the EGM, subsequent interactions between the mobile device application and the EGM occur without any subsequent physical interaction between the mobile device and the EGM. That is, to avoid having the player retrieve the mobile device and repeat the physical operation of engaging the EGM with the mobile device, certain embodiments enable the player to execute one or more functions without repeating the above-described physical operation of engaging the EGM with the mobile device. In certain such embodiments, the mobile device application utilizes one or more display devices of the EGM to display to the player information and/or player selectable prompts which are otherwise displayable via the display device of the mobile device.

In certain other embodiments, for each interaction or requested action between the EGM and the mobile device described herein, the system requires the player to reengage the EGM with the mobile device to reestablish or confirm the pairing between the EGM and the mobile device. In certain other embodiments, for each interaction between the EGM and the mobile device that occur a designated amount of time after the last engagement of the EGM with the mobile device, the system requires the player to reengage the EGM with the mobile device to reestablish or confirm the pairing between the EGM and the mobile device.

Utilizing Paired Mobile Device Application at EGM

In various embodiments, after pairing the mobile device with the EGM (or a component of the EGM), the mobile device application communicates one or more requested actions to be performed to the EGM. As described below, such requested actions generally pertain to an action associated with a player account, an action associated with an initiation of a transfer of non-monetary funds (i.e., non-cashable credits), an action associated with an initiation of a transfer of monetary funds or an action associated with a transfer of promotional credits. It should be appreciated that while certain data or information pertaining to one or more of the requested actions are communicated from an EGM (or a component of an EGM, such as a component of a gaming establishment management system supported by or otherwise located inside the EGM) to a mobile device, such data or information may additionally or alternatively be communicated: (i) from one or more servers to a mobile device via one or more wireless communication protocols, or (ii) from an EGM to one or more servers via one or more wireless communication protocols and then from one or more servers to a mobile device via one or more wireless communication protocols.

It should additionally be appreciated that the mobile device facilitated EGM to/from cashless wagering account fund data transfers of the present disclosure may occur in addition to or as an alternative from cash-based fund transfers and/or ticket voucher-based fund transfers. In one such embodiment, a credit balance of an EGM of the present disclosure is funded via any of a mobile device facilitated fund transfer, a cash-based fund transfer or a ticket voucher-based fund transfer. In another embodiment, a credit balance of an EGM of the present disclosure is cashed out via any of a mobile device facilitated fund transfer, a cash-based fund transfer or a ticket voucher-based fund transfer. In another embodiment, a credit balance of an EGM of the present disclosure is funded via a mobile device facilitated fund transfer or a cash-based fund transfer (but is not funded via any ticket voucher-based fund transfer). In another embodiment, a credit balance of an EGM of the present disclosure is cashed out via a mobile device facilitated fund transfer or a cash-based fund transfer (but is not cashed out via any ticket voucher-based fund transfer). In another embodiment, a credit balance of an EGM of the present disclosure is funded via a mobile device facilitated fund transfer or a ticket voucher-based fund transfer (but is not funded via any cash-based fund transfer). In another embodiment, a credit balance of an EGM of the present disclosure is cashed out via a mobile device facilitated fund transfer or a ticket voucher-based fund transfer (but is not cashed out via any cash-based fund transfer). In another embodiment, a credit balance of an EGM of the present disclosure is funded via a mobile device facilitated fund transfer (but is not funded via a cash-based fund transfer nor a ticket voucher-based fund transfer). In another embodiment, a credit balance of an EGM of the present disclosure is cashed out via a mobile device facilitated fund transfer (but is not cashed out via a cash-based fund transfer nor a ticket voucher-based fund transfer).

It should be further appreciated that any functionality or process described herein may be implemented via one or more servers, an EGM, one or more components of an EGM (such as a component of a gaming establishment management system (e.g., a player tracking unit) supported by or otherwise located inside the EGM), or a mobile device application. For example, while certain data or information described herein is explained as being communicated from an EGM or a component of an EGM (such as a component of a gaming establishment management system (e.g., a player tracking unit) supported by or otherwise located inside the EGM) to a mobile device via one or more wireless communication protocols, such data or information may additionally or alternatively be communicated from one or more servers to a mobile device via one or more wireless communication protocols. Accordingly: (i) while certain functions, features or processes are described herein as being performed by an EGM, such functions, features or processes may alternatively be performed by one or more servers, or one or more mobile device applications, or one or more components of the EGM (such as a component of a gaming establishment management system (e.g., a player tracking unit) supported by or otherwise located inside the EGM), (ii) while certain functions, features or processes are described herein as being performed by one or more mobile device applications, such functions, features or processes may alternatively be performed by one or more servers, or one or more EGMs, or one or more components of the EGM (such as a component of a gaming establishment management system (e.g., a player tracking unit) supported by or otherwise located inside the EGM), (iii) while certain functions, features or processes are described herein as being performed by one or more servers, such functions, features or processes may alternatively be performed by one or more EGMs, or one or more mobile device applications, or one or more components of the EGM (such as a component of a gaming establishment management system (e.g., a player tracking unit) supported by or otherwise located inside the EGM)), and (iv) while certain functions, features or processes are described herein as being performed by one or more components of an EGM (such as a component of a gaming establishment management system (e.g., a player tracking unit) supported by or otherwise located inside the EGM), such functions, features or processes may alternatively be performed by one or more EGMs, or one or more mobile device applications, or one or more servers.

Player Accounts

Figure 2A:
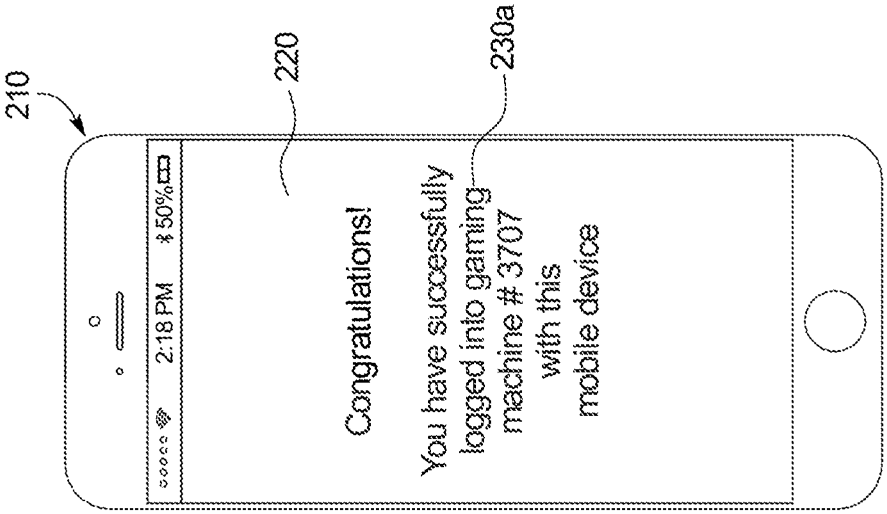
FIGS. 2A, 2B, 2C, 2D, 2E, and 2F are example graphical user interfaces displayed on a mobile device in connection with actions initiated at a mobile device and completed at an EGM.

In certain embodiments, the action to be performed includes enabling the player to log into a casino loyalty account, such as a player tracking account, via a wireless communication protocol, utilizing the mobile device application. In certain such embodiments, following the launching of the mobile device application, such as following the player selecting an image associated with an electronic casino loyalty account card stored via a digital wallet application or following the mobile device application retrieving data associated with a player loyalty account stored via a digital wallet application, the mobile device application prompts the player to cause the mobile device to engage the EGM, such as prompting the player to tap the mobile device to a card reader or other designated location (s) of the EGM. After such engagement (or after the launching of the mobile device application if no mobile device to EGM engagement is required), the mobile device application communicates, via a wireless communication protocol, player loyalty account data stored by the mobile device to the EGM (or a component of the EGM). The EGM proceeds with operating with a player loyalty system (i.e., a player tracking system) to log the player into the player loyalty account at that EGM. For example, as seen in FIG. 2A, the mobile device application 220 of the mobile device 210 proceeds with displaying a confirmation message that the player is logged into the player loyalty account 230*a*. Thereafter, any game play activity is associated with this player loyalty account (just as if the player would have inserted a physical player tracking card into a player tracking card reader of the EGM).

Figure 2B:
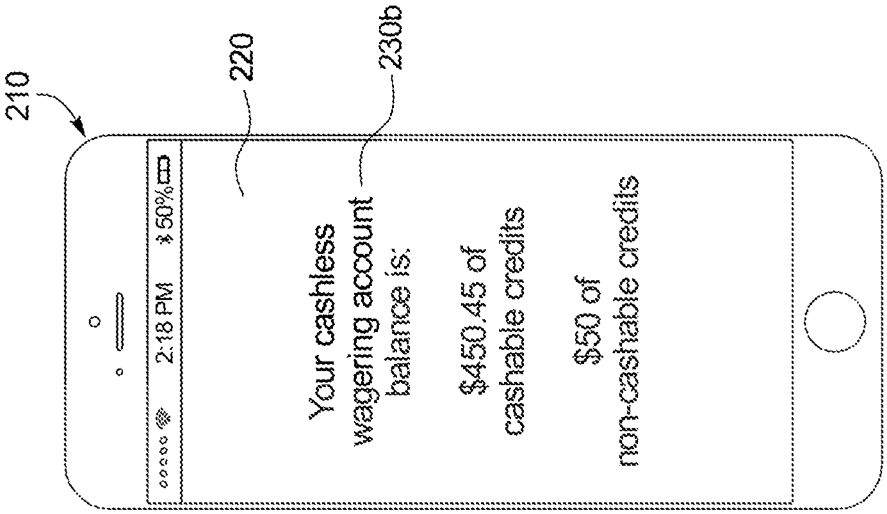
Figure 2C:
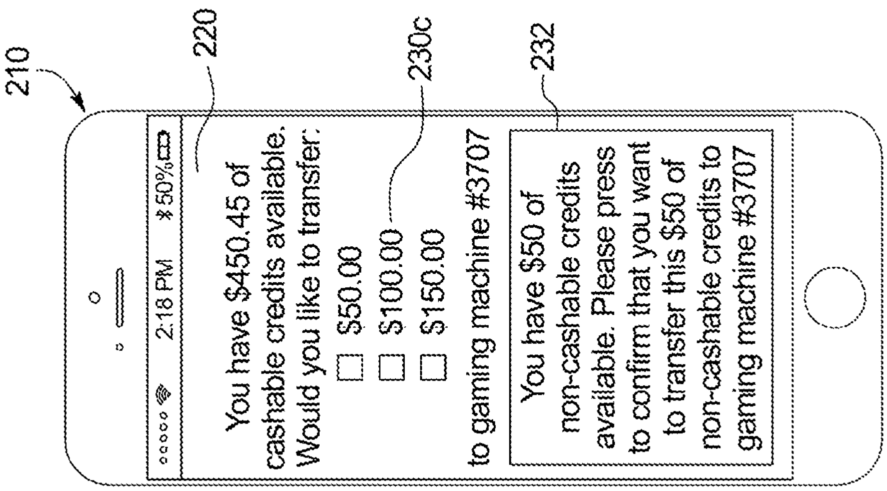

In certain embodiments, the action to be performed includes enabling the player to log out of a casino loyalty account, such as a player tracking account, via a wireless communication protocol, utilizing the mobile device application. In different embodiments, upon receiving one or more "cash out" inputs from the player, if the system determines that no activity has occurred for a designated amount of time, or if the system determines that another player is attempting to log onto the EGM, the mobile device application facilitates a logging out of the casino loyalty account. Such logging out of the casino loyalty account is associated with a termination of the player's current gaming session. Specifically, the EGM proceeds with operating with a player loyalty system (i.e., a player tracking system) to log the player out of the player loyalty account at that EGM to complete the player tracking session at the EGM. For example, as seen in FIG. 2E, the mobile device application 220 of the mobile device 210 proceeds with displaying an icon 230*e* which enables the player to log out of the player loyalty account.

In certain embodiments, the action to be performed additionally or alternatively includes enabling the player to log into a cashless wagering account, via a wireless communication protocol, utilizing the mobile device application. In certain such embodiments, such as seen in FIG. 2D, following the launching of the mobile device application, such as following the player selecting an image associated with an electronic casino loyalty account card stored via a digital wallet application or following the mobile device application retrieving data associated with a cashless wagering account stored via a digital wallet application, the mobile device application prompts the player to cause the mobile device to engage the EGM, such as prompting the player to tap the mobile device to a card reader or other designated location(s) of the EGM. After such engagement (or after the launching of the mobile device application if no mobile device to EGM engagement is required), the mobile device application communicates, via a wireless communication protocol, player cashless wagering account data stored by the mobile device to the EGM. The EGM proceeds with operating with the cashless wagering system to log the player into a cashless wagering account associated with the player. In one embodiment, the system determines a balance of the cashless wagering account (in terms of both cashable credits and non-cashable credits) associated with the player and causes the EGM to communicate, via one or more wireless communication protocols, the determined cashless wagering account balance to the mobile device. In another embodiment, the system determines balance(s) of the cashless wagering account (in terms of cashable credits and non-cashable credits) associated with the player and communicates, via one or more wireless communication protocols, the determined cashless wagering account balance(s) to the mobile device. For example, as seen in FIG. 2B, the mobile device application 220 of the mobile device 210 proceeds with displaying the determined amount of cashable credits in the cashless wagering account balance and the determined amount of non-cashable credits in the cashless wagering account 230*b*.

Transfer of Non-Cashable Credits

In certain embodiments, the action to be performed additionally or alternatively includes transferring non-cashable credits from the cashless wagering account to the EGM utilizing the mobile device application. In certain such embodiments, following the transfer of funds from a gaming establishment retail account to a cashless wagering account in the form of non-cashable credits, the system utilizes the mobile device application to transfer such non-cashable credits to the EGM for wagering.

In certain such embodiments, following the launching of the mobile device application, such as following the player selecting an image associated with an electronic casino loyalty account card stored via a digital wallet application or following the mobile device application retrieving data associated with a cashless wagering account stored via a digital wallet application, the mobile device application determines an amount of non-cashable funds to be transferred from the cashless wagering account to the EGM.

In one embodiment, the mobile device application enables the player to select to transfer the amount of non-cashable credits from the cashless wagering account to the EGM. For example, as seen in FIG. 2C, the mobile device application 220 of the mobile device 210 proceeds with enabling the player to make an input 232 to confirm that they want their current balance of non-cashable credits to be transferred from the cashless wagering account to the EGM.

In one embodiment, the mobile device application enables the player to select an amount of non-cashable credits to be transferred from a listing of available amounts of funds to be transferred from the cashless wagering account to the EGM.

In different embodiments, the listing of available amounts of non-cashable credits to be transferred is previously selected by the player, selected by a gaming establishment or selected by a third-party. In certain embodiments, the mobile device application enables the player, a gaming establishment and/or a third-party to modify the listing of available amounts of non-cashable funds. In another embodiment, the mobile device application determines the listing of available amount of funds based on one or more characteristics associated with the player, such as the player's prior amounts transferred, the player's wagering history, and/or the player's status. In another embodiment, the mobile device application determines the listing of available amount of funds based on one or more characteristics associated with the EGM, such as based on the denomination, game type, minimum bet and/or maximum available wager amount of the EGM.

In one embodiment, the mobile device application includes more than one listing of available amounts of non-cashable funds to be transferred. In this embodiment, the mobile device application includes one listing of available amounts for an initial transfer of funds to the EGM for a gaming session (i.e., a first listing of amounts to initially establish a credit balance of an EGM) and another listing of available amounts for a subsequent transfer of funds to the EGM for an existing gaming session (i.e., a second listing of amounts to modify a previously established credit balance of the EGM).

In another embodiment, the mobile device application determines a default amount of non-cashable funds to be transferred from the cashless wagering account to the EGM. In one such embodiment, the default amount of funds includes the last amount of funds transferred from the cashless wagering account to the EGM. In another such embodiment, the default amount of funds includes the last amount of funds transferred from the EGM to the cashless wagering account. The mobile device application displays to the player such a default amount of funds to be transferred.

In different embodiments, the default amount to be transferred is previously selected by the player, selected by a gaming establishment or selected by a third-party. In certain embodiments, the mobile device application enables the player, a gaming establishment and/or a third-party to modify the default amount of non-cashable funds displayed by the mobile device application. In another embodiment, the mobile device application determines the default amount of funds based on one or more characteristics associated with the player, such as the player's prior amounts transferred, the player's wagering history, the player's credit balance, or the player's status.

In one embodiment, the mobile device application includes more than one default amount of non-cashable funds to be transferred. In this embodiment, the mobile device application includes one default amount for an initial transfer of funds to the EGM for a gaming session (i.e., a first default amount to initially establish a credit balance of an EGM) and another default amount for a subsequent transfer of funds to the EGM for an existing gaming session (i.e., a second default amount to modify a previously established credit balance of the EGM).

In certain embodiments, following the determination of an amount of non-cashable funds to be transferred from the cashless wagering account to the EGM, the mobile device application prompts the player to cause the mobile device to engage the EGM, such as prompting the player to tap the mobile device to a player tracking card reader or other designated location(s) of the EGM. After such engagement (or after the determination of an amount of funds to be transferred if no mobile device to EGM engagement is required), the mobile device application communicates, via a wireless communication protocol, data associated with the determined amount of non-cashable funds to be transferred from the cashless wagering account to the EGM. The EGM proceeds with operating with the cashless wagering system to log the player into a cashless wagering account associated with the player (if necessary) and request the determined amount of non-cashable funds to be transferred from the cashless wagering account to the EGM.

In another embodiment, rather than prompting the player to engage the EGM with the mobile device and the subsequent engagement of the EGM with the mobile device, the mobile device application automatically determines to transfer a default amount of non-cashable funds, such as the last transferred amount of funds, from the cashless wagering account to the EGM. In this embodiment, the mobile device application communicates, via a wireless communication protocol, data associated with the determined amount of funds to be transferred from the cashless wagering account to the EGM. The EGM proceeds with operating with a cashless wagering system to log the player into a cashless wagering account associated with the player (if necessary) and request the determined amount of funds to be transferred from the cashless wagering account to the EGM.

Following the EGM requesting the determined amount of non-cashable funds, the cashless wagering system determines whether to authorize the transfer of the determined amount of non-cashable funds. If the cashless wagering system determines not to authorize the determined amount of funds, the cashless wagering system communicates a denial to the EGM and/or the mobile device application, wherein the EGM and/or mobile device application display a denial of funds transfer to the player.

On the other hand, if the cashless wagering system determines to authorize the determined amount of non-cashable funds, the cashless wagering system updates the cashless wagering account associated with the player and communicates an authorization to the EGM. The cashless wagering system reduces a balance of the cashless wagering account by the reduced amount of non-cashable funds. The EGM proceeds with updating a credit balance of the EGM, such as a non-cashable credit balance, to account for the determined amount of funds. In certain embodiments, the EGM further proceeds with communicating a transfer of funds confirmation to the mobile device, wherein the mobile device application displays a confirmation of the transfer of the amount of funds and/or the updated credit balance of the EGM. Such a transfer amount of funds is available for wagering by the player.

In certain embodiments, the action to be performed additionally or alternatively includes automatically transferring non-cashable funds from a cashless wagering account to the EGM utilizing the mobile device application. In one such embodiment, the gaming system includes an automatic reload feature wherein if a credit balance of the EGM, such as a non-cashable credit balance, falls below a threshold level, the mobile device automatically transfers an amount of non-cashable funds from the cashless wagering account to the EGM to facilitate additional wagering opportunities. It should be appreciated that, in certain embodiments, the gaming system enables the player to enable or disable such an automatic reload feature.

In another embodiment, the EGM periodically communicates information to the mobile device regarding the status or amount of the non-cashable credit balance of the EGM.

In one such embodiment, based on this communicated information, the mobile device application determines when to alert the player to potentially transfer additional non-cashable funds to the EGM utilizing the mobile device application. For example, the mobile device application could vibrate the mobile device, or create a sound, which alerts the player to view the mobile device application and select which additional non-cashable funds to virtually insert into or load on the EGM.

In certain embodiments, the action to be performed additionally or alternatively includes enabling the player to transfer non-cashable funds from an EGM to a cashless wagering account facilitated by the mobile device application. That is, the system of this disclosure enables a player to transfer unused non-cashable credits from the EGM back to a cashless wagering account in association with the mobile device application. In certain such embodiments, following the launching of the mobile device application, such as following the player selecting an image associated with an electronic casino loyalty account card stored via a digital wallet application or following the mobile device application retrieving data associated with a cashless wagering account stored via a digital wallet application, and receiving one or more "cash out" inputs from the player, the mobile device application determines an amount of non-cashable funds to be transferred from the EGM to the cashless wagering account.

In one embodiment, the mobile device application enables the player to select an amount of unused non-cashable credits to be transferred from the EGM to the cashless wagering account. In another embodiment, the mobile device application determines to transfer part or all of the unused non-cashable credits of the credit balance of the EGM from the EGM to the cashless wagering account.

In certain embodiments, following the determination of an amount of unused non-cashable credits to be transferred from the EGM to the cashless wagering account, the mobile device application prompts the player to cause the mobile device to engage the EGM, such as prompting the player to tap the mobile device to a player tracking card reader or other designated location(s) of the EGM.

In certain other embodiments, the system determines to facilitate the transfer of unused non-cashable credits from the EGM to the cashless wagering account independent of any input by the player and/or independent of any engagement between the mobile device and the EGM. In one such embodiment, if the system determines that no activity has occurred for a designated amount of time, as a precautionary measure, the system transfers any unused non-cashable credits of the credit balance of the EGM from the EGM to the cashless wagering account used to transfer funds to the EGM. In another embodiment, if the system determines that another player is attempting to log onto the EGM, as a precautionary measure, the system transfers any unused non-cashable credits of the credit balance of the EGM from the EGM to the cashless wagering account used to transfer funds to the EGM. Such transfers of the unused non-cashable credits of the credit balance to the cashless wagering account are associated with a termination of the player's current gaming session.

In these embodiments, after any engagement between the mobile device and the EGM (or after the determination of an amount of non-cashable funds to be transferred if no mobile device to EGM engagement is required), the mobile device application communicates, via a wireless communication protocol, data associated with the determined amount of non-cashable funds to be transferred from the EGM to the cashless wagering account. The EGM proceeds with operating with a cashless wagering system to log the player into a cashless wagering account associated with the player (or confirm that the player remains logged into the cashless wagering account) and request the determined amount of non-cashable funds to be transferred from the EGM to the cashless wagering account. Following such a request, the EGM proceeds with updating a credit balance of the EGM to account for the determined amount of non-cashable funds transferred from the EGM to the cashless wagering account. The cashless wagering system additionally updates the cashless wagering account associated with the player (i.e., the cashless wagering system adds the determined amount of non-cashable funds to the cashless wagering account) and communicates a confirmation to the EGM. The EGM further proceeds with communicating a transfer of funds confirmation to the mobile device, wherein the mobile device application displays a confirmation of the transfer of the amount of funds and/or the updated credit balance of the EGM. Such a transferred amount of non-cashable funds is available in the player's cashless wagering account to be transferred to another EGM.

Transfer of Cashable Credits

In certain embodiments, the action to be performed additionally or alternatively includes enabling the player to facilitate the transfer of cashable funds from a cashless wagering account to the EGM utilizing the mobile device application. In certain such embodiments, following the launching of the mobile device application, such as following the player selecting an image associated with an electronic casino loyalty account card stored via a digital wallet application or following the mobile device application retrieving data associated with a cashless wagering account stored via a digital wallet application, the mobile device application determines an amount of funds to be transferred from the cashless wagering account to the EGM.

In one embodiment, the mobile device application enables the player to select an amount of cashable credits to be transferred from a listing of available amounts of funds to be transferred from the cashless wagering account to the EGM. For example, as seen in FIG. 2C, in addition to enabling the player to make an input to confirm a transfer of an amount of non-cashable credits as described above, the mobile device application 220 of the mobile device 210 proceeds with displaying a listing of available, selectable amounts of cashable credits to be transferred from the cashless wagering account to the EGM 230*c*.

In different embodiments, the listing of available amounts to be transferred is previously selected by the player, selected by a gaming establishment or selected by a third-party. In certain embodiments, the mobile device application enables the player, a gaming establishment and/or a third-party to modify the listing of available amount of funds. In another embodiment, the mobile device application determines the listing of available amount of funds based on one or more characteristics associated with the player, such as the player's prior amounts transferred, the player's wagering history, and/or the player's status. In another embodiment, the mobile device application determines the listing of available amount of funds based on one or more characteristics associated with the EGM, such as based on the denomination, game type, minimum bet and/or maximum available wager amount of the EGM. In a first example, if the EGM is a collection of $1 poker games, then the listing of available amounts displayed are $40, $80, $120, In a second example, if the EGM is a penny slots game, then the listing of available amounts displayed are $20, $40, $60.

In one embodiment, the mobile device application includes more than one listing of available amounts of cashable funds to be transferred. In this embodiment, the mobile device application includes one listing of available amounts for an initial transfer of funds to the EGM for a gaming session (i.e., a first listing of amounts to initially establish a credit balance of an EGM) and another listing of available amounts for a subsequent transfer of funds to the EGM for an existing gaming session (i.e., a second listing of amounts to modify a previously established credit balance of the EGM).

In another embodiment, the mobile device application determines a default amount of cashable funds to be transferred from the cashless wagering account to the EGM. In one such embodiment, the default amount of funds includes the last amount of funds transferred from the cashless wagering account to the EGM. In another such embodiment, the default amount of funds includes the last amount of funds transferred from the EGM to the cashless wagering account. The mobile device application displays to the player such a default amount of funds to be transferred.

In different embodiments, the default amount to be transferred is previously selected by the player, selected by a gaming establishment or selected by a third-party. In certain embodiments, the mobile device application enables the player, a gaming establishment and/or a third-party to modify the default amount of funds displayed by the mobile device application. In another embodiment, the mobile device application determines the default amount of funds based on one or more characteristics associated with the player, such as the player's prior amounts transferred, the player's wagering history, the player's credit balance, or the player's status.

In one embodiment, the mobile device application includes more than one default amount of cashable funds to be transferred. In this embodiment, the mobile device application includes one default amount for an initial transfer of funds to the EGM for a gaming session (i.e., a first default amount to initially establish a credit balance of an EGM) and another default amount for a subsequent transfer of funds to the EGM for an existing gaming session (i.e., a second default amount to modify a previously established credit balance of the EGM).

In certain embodiments, following the determination of an amount of cashable funds to be transferred from the cashless wagering account to the EGM, the mobile device application prompts the player to cause the mobile device to engage the EGM, such as prompting the player to tap the mobile device to a player tracking card reader or other designated location(s) of the EGM. After such engagement (or after the determination of an amount of funds to be transferred if no mobile device to EGM engagement is required), the mobile device application communicates, via a wireless communication protocol, data associated with the determined amount of funds to be transferred from the cashless wagering account to the EGM. The EGM proceeds with operating with a cashless wagering system to log the player into a cashless wagering account associated with the player (if necessary) and request the determined amount of funds to be transferred from the cashless wagering account to the EGM.

In another embodiment, rather than prompting the player to engage the EGM with the mobile device and the subsequent engagement of the EGM with the mobile device, the mobile device application automatically determines to transfer a default amount of funds, such as the last transferred amount of funds, from the cashless wagering account to the EGM. In this embodiment, the mobile device application communicates, via a wireless communication protocol, data associated with the determined amount of funds to be transferred from the cashless wagering account to the EGM. The EGM proceeds with operating with a cashless wagering system to log the player into a cashless wagering account associated with the player (if necessary) and request the determined amount of funds to be transferred from the cashless wagering account to the EGM.

Following the EGM requesting the determined amount of cashable funds, the cashless wagering system determines whether to authorize the transfer of the determined amount of funds. If the cashless wagering system determines not to authorize the determined amount of funds, the cashless wagering system communicates a denial to the EGM and/or the mobile device application, wherein the EGM and/or mobile device application display a denial of funds transfer to the player.

On the other hand, if the cashless wagering system determines to authorize the determined amount of cashable funds, the cashless wagering system updates the cashless wagering account associated with the player and communicates an authorization to the EGM. The cashless wagering system reduces a balance of the cashless wagering account by the reduced amount of cashable funds. The EGM proceeds with updating a credit balance of the EGM to account for the determined amount of funds. In certain embodiments, the EGM further proceeds with communicating a transfer of cashable funds confirmation to the mobile device, wherein the mobile device application displays a confirmation of the transfer of the amount of cashable funds and/or the updated credit balance of the EGM. Such a transfer amount of funds is available for wagering by the player or transferring to a gaming establishment retail account (via the cashless wagering account as described above).

In certain embodiments, the action to be performed additionally or alternatively includes automatically transferring cashable funds from a cashless wagering account to the EGM utilizing the mobile device application. In one such embodiment, the gaming system includes an automatic reload feature wherein if a credit balance of the EGM falls below a threshold level, the mobile device automatically transfers an amount of funds from the cashless wagering account to the EGM to facilitate additional wagering opportunities. It should be appreciated that, in certain embodiments, the gaming system enables the player to enable or disable such an automatic reload feature.

In certain embodiments, the action to be performed additionally or alternatively includes enabling the player to transfer funds from a virtual ticket voucher to the EGM utilizing the mobile device application. In certain embodiments, following the launching of the mobile device application, such as following the player selecting an image associated with an electronic casino loyalty account card stored via a digital wallet application, the mobile device application determines an amount of funds to be transferred to the EGM via the redemption of a virtual ticket voucher. In these embodiments, the mobile device application displays to the player images representing any virtual ticket vouchers associated with the mobile device. The mobile device application enables the player to select one or more images representing one or more virtual ticket vouchers associated with the mobile device. In these embodiments, similar to as described above with respect to the transfer of funds from a cashless wagering account to an EGM via a mobile device application, following the determination of which virtual ticket vouchers are to be transferred from the mobile device application to the EGM, the mobile device application prompts the player to cause the mobile device to engage the EGM. The mobile device application then communicates, via a wireless communication protocol, data associated with the selected virtual ticket voucher to be transferred. The EGM then communicates with one or more servers, such as a virtual ticket voucher server, to request the selected virtual ticket voucher (and more specifically the amount of funds associated with the selected virtual ticket voucher) be transferred from to the EGM. The server then determines whether to authorize the transfer of the selected virtual ticket voucher. If the transfer of the selected virtual ticket voucher is authorized: (i) the server updates a database of virtual ticket vouchers to reflect the redemption of the selected virtual ticket voucher, (ii) the EGM proceeds with updating a credit balance of the EGM to account for the amount of funds associated with the selected virtual ticket voucher, (iii) a transfer of funds confirmation is communicated to and displayed by the mobile device, and (iv) the amount of funds associated with the selected virtual ticket voucher are available for wagering by the player.

In certain other embodiments, following a full or partial depletion of a credit balance of the EGM, the EGM wirelessly communicates with the mobile device and queries the mobile device for the presence of any additional virtual ticket vouchers associated with the mobile device application. That is, when the credit balance of the EGM is empty, when the credit balance of the EGM has less than an amount of credits to repeat a previous wager, when the credit balance of the EGM has less credits than a minimum wager and/or when the credit balance of the EGM is below a designated threshold amount, the EGM communicates with the mobile device to determine if the mobile device application is associated with any additional available virtual ticket vouchers. If no additional virtual ticket vouchers are available, the EGM prompts the player to fund the credit balance of the EGM via another funding avenue as disclosed herein. On the other hand, if at least one virtual ticket voucher is available, the EGM operates with the mobile device to facilitate the transfer of such at least one virtual ticket voucher to the EGM. In one such embodiment, the mobile device application communicates a listing of available virtual ticket vouchers to the EGM. The EGM proceeds with displaying the listing of available virtual ticket vouchers and enables the player to select one or more of the available virtual ticket vouchers to redeem. If the player selects one or more of the available virtual ticket vouchers, the EGM communicates the player's selection to the mobile device and the mobile device application proceeds with facilitating the transfer of such virtual ticket vouchers to the EGM as described herein. It should be appreciated that this embodiment enables a player to utilize a mobile device to facilitate the transfer funds, such as transfer of funds associated with one or more virtual ticket vouchers associated with the mobile device, without having to reengage the EGM with the mobile device.

In certain other embodiments, following a full or partial depletion of a credit balance of the EGM, the EGM wirelessly communicates with the mobile device (or communicates with one or more server which communicate with the EGM) and queries the mobile device for the presence of any additional virtual ticket vouchers associated with the mobile device application. If no additional virtual ticket vouchers are available, the EGM prompts the player to fund the credit balance of the EGM via another funding avenue as disclosed herein. On the other hand, if at least one virtual ticket voucher is available, the mobile device application proceeds with facilitating the automatic transfer of the at least one virtual ticket voucher to the EGM as described herein. It should be appreciated that this embodiment enables a player to automatically transfer funds, such as transfer of funds associated with one or more virtual ticket vouchers associated with the mobile device, via the mobile device without the player having to reengage the EGM with the mobile device and without the player having to prompt either the EGM or the mobile device application to initiate such a transfer. It should be further appreciated that, in certain embodiments, the gaming system enables the player to enable or disable such an automatic "transfer of virtual ticket vouchers" feature.

In another embodiment, the EGM periodically communicates information to the mobile device regarding the status or amount of the credit balance of the EGM. In one such embodiment, based on this communicated information, the mobile device application determines when to alert the player to potentially transfer additional funds to the EGM utilizing the mobile device application. For example, the mobile device application could vibrate the mobile device, or create a sound, which alerts the player to view the mobile device application and select which additional funds to virtually insert into or load on the EGM. In another such embodiment, based on this communicated information, the mobile device application determines when to automatically transfer one or more additional and available virtual ticket vouchers to the EGM.

In certain embodiments, the action to be performed additionally or alternatively includes enabling the player to transfer cashable funds from an EGM to a cashless wagering account facilitated by the mobile device application. That is, the system of this disclosure enables a player to transfer winnings from the EGM back to a cashless wagering account in association with the mobile device application. In certain such embodiments, following the launching of the mobile device application, such as following the player selecting an image associated with an electronic casino loyalty account card stored via a digital wallet application or following the mobile device application retrieving data associated with a cashless wagering account stored via a digital wallet application, and receiving one or more "cash out" inputs from the player, the mobile device application determines an amount of funds to be transferred from the EGM to the cashless wagering account.

In one embodiment, the mobile device application enables the player to select an amount to be transferred from the EGM to the cashless wagering account. In one such embodiment, the mobile device application enables the player to select a portion of the credit balance of the EGM (i.e., less than the entire credit balance) to be transferred from the EGM to the cashless wagering account. In various examples, the mobile device application automatically selects an amount of any winnings (i.e., an amount of the credit balance over the initial credit balance), an amount of winnings over a designated amount, an amount of a last win (i.e., an award amount associated with the last played game) or an amount of a last win over a designated amount (i.e., an award amount associated with the last played game over a designated award amount) to be transferred from the EGM to the cashless wagering account. In another embodiment, the mobile device application determines to transfer the credit balance of the EGM from the EGM to the cashless wagering account.

In certain embodiments, following the determination of an amount of cashable funds to be transferred from the EGM to the cashless wagering account, the mobile device application prompts the player to cause the mobile device to engage the EGM, such as prompting the player to tap the mobile device to a player tracking card reader or other designated location(s) of the EGM.

In certain other embodiments, the system determines to facilitate the transfer of cashable funds from the EGM to the cashless wagering account independent of any input by the player and/or independent of any engagement between the mobile device and the EGM. In one such embodiment, if the system determines that no activity has occurred for a designated amount of time, as a precautionary measure, the system transfers the credit balance of the EGM from the EGM to the cashless wagering account used to transfer funds to the EGM. In another embodiment, if the system determines that another player is attempting to log onto the EGM, as a precautionary measure, the system transfers the credit balance of the EGM from the EGM to the cashless wagering account used to transfer funds to the EGM. Such transfers of the credit balance to the cashless wagering account is associated with a termination of the player's current gaming session.

After any engagement between the mobile device and the EGM (or after the determination of an amount of funds to be transferred if no mobile device to EGM engagement is required), the mobile device application communicates, via a wireless communication protocol, data associated with the determined amount of cashable funds to be transferred from the EGM to the cashless wagering account. The EGM proceeds with operating with a cashless wagering system to log the player into a cashless wagering account associated with the player (or confirm that the player remains logged into the cashless wagering account) and request the determined amount of funds to be transferred from the EGM to the cashless wagering account. Following such a request, the EGM proceeds with updating a credit balance of the EGM to account for the determined amount of cashable funds transferred from the EGM to the cashless wagering account. The cashless wagering system additionally updates the cashless wagering account associated with the player (i.e., the cashless wagering system adds the determined amount of cashable funds to the cashless wagering account) and communicates a confirmation to the EGM. The EGM further proceeds with communicating a transfer of funds confirmation to the mobile device, wherein the mobile device application displays a confirmation of the transfer of the amount of funds and/or the updated credit balance of the EGM. Such a transferred amount of funds is available in the player's cashless wagering account to be transferred to another EGM or transferred to a gaming establishment retail account as described here.

In certain embodiments, as described above, the cashless wagering account is associated with one or more external accounts, such as one or more credit card accounts, one or more debit card accounts and/or one or more third-party maintained accounts (e.g., one or more PayPal® accounts or Venmo® accounts). In certain such embodiments, the gaming system enables a player to transfer an amount of funds to such an external account. For example, after a player utilizes the mobile device application to "cash out" an amount of winnings from the EGM to the cashless wagering account, the system enables the player to proceed with transferring, facilitated by the mobile device application, part or all of the amount of winnings to one or more external accounts.

In certain embodiments, the action to be performed additionally or alternatively includes automatically transferring funds from the EGM to a cashless wagering account utilizing the mobile device application. In one such embodiment, the gaming system includes an automatic "cash out" feature wherein if a credit balance of the EGM reaches above a threshold level, the mobile device automatically transfers an amount of funds from the EGM to the cashless wagering account. Such an automatic "cash out" feature is associated with a termination of the player's current gaming session. It should be appreciated that, in certain embodiments, the gaming system enables the player to enable or disable such an automatic "cash out" feature.

It should be appreciated that the mobile device facilitated fund data transfers of the present disclosure may occur in addition to or as an alternative from cash-based fund transfers and/or ticket voucher-based fund transfers. In one such embodiment, an EGM of the present disclosure is funded via any of a mobile device facilitated fund transfer, a cash-based fund transfer or a ticket voucher-based fund transfer. In another embodiment, a credit balance of an EGM of the present disclosure is cashed out via any of a mobile device facilitated fund transfer, a cash-based fund transfer or a ticket voucher-based fund transfer. In another embodiment, an EGM of the present disclosure is funded via a mobile device facilitated fund transfer or a cash-based fund transfer (but is not funded via any ticket voucher-based fund transfer). In another embodiment, a credit balance of an EGM of the present disclosure is cashed out via a mobile device facilitated fund transfer or a cash-based fund transfer (but is not cashed out via any ticket voucher-based fund transfer). In another embodiment, an EGM of the present disclosure is funded via a mobile device facilitated fund transfer or a ticket voucher-based fund transfer (but is not funded via any cash-based fund transfer). In another embodiment, a credit balance of an EGM of the present disclosure is cashed out via a mobile device facilitated fund transfer or a ticket voucher-based fund transfer (but is not cashed out via any cash-based fund transfer). In another embodiment, an EGM of the present disclosure is funded via a mobile device facilitated fund transfer (but is not funded via a cash-based fund transfer nor a ticket voucher-based fund transfer). In another embodiment, a credit balance of an EGM of the present disclosure is cashed out via a mobile device facilitated fund transfer (but is not cashed out via a cash-based fund transfer nor a ticket voucher-based fund transfer).

Transfer of Promotional Funds

In certain embodiments, the action to be performed additionally or alternatively includes transferring promotional funds from a player account, such as a cashless wagering account, to the EGM utilizing the mobile device application. In certain such embodiments, rather than utilizing physical promotional tickets (i.e., an instrument associated with a quantity of promotional credits redeemable for game play on EGM, but not otherwise redeemable for cash) which represent promotional credits, the system utilizes an electronic or virtual ticket to represent promotional funds. In other such embodiments, rather than a player redeeming a physical promotional ticket at a kiosk or player services desk to cause an amount of promotional credits associated with the physical promotional ticket to be associated with a player tracking account, the system utilizes the mobile device application to redeem such promotional credits.

In certain embodiments, to obtain promotional funds, such as one or more electronic or virtual promotional tickets, a gaming establishment communicates data associated with promotional funds, such as an electronic or virtual promotional ticket, to the mobile device application (or a server maintained account associated with the mobile device application). It should be appreciated that data associated with promotional funds, such as one or more electronic promotional tickets, could be communicated to the mobile devices of a plurality of players (e.g., a gaming establishment communicates to each player with a registered mobile device application a promotional ticket of promotional credits for free play of a new gaming machine the gaming establishment is currently promoting) and/or could be communicated to the mobile device of a particular player (e.g., a gaming establishment communicates to a promotional ticket of promotional credits to a valued player, wherein the promotional credits are redeemable for free play of any gaming machine in the gaming establishment).

In one such embodiment of communicating data associated with promotional funds, such as an electronic or virtual promotional ticket, to the mobile device application (or a server maintained account associated with the mobile device application), one or more servers, such as a gaming establishment promotional server, send a message, such as an email or text message, to a player. The message includes a hyperlink and/or an attachment associated with the promotional funds, such as an electronic promotional ticket. When the player accesses the hyperlink and/or attachment via the player's mobile device, the mobile device activates or launches the mobile device application and the associated promotional funds, such as the associated electronic promotional ticket, are transferred to the mobile device application (or a server maintained account associated with the mobile device application).

In another such embodiment of a gaming establishment communicating data associated with promotional funds, such as an electronic or virtual promotional ticket, to the mobile device application (or a server maintained account associated with the mobile device application), one or more servers, such as a gaming establishment promotional server, send a message, such as an email or text message, to a player. The message of this embodiment does not include any hyperlink or attachment associated with any promotional funds, such as any electronic promotional tickets and thus no promotional funds are transferred to the mobile device application via this message. Rather, the message of this embodiment notifies the player that an account associated with the player has been credited with promotional funds. Such a message could include information associated with the available promotional funds (e.g., an amount of promotional credits, a promotional fund identifier, and/or a time window which the promotional funds may be redeemed). In this embodiment, when the mobile device application is activated or launched by a player, the mobile device application queries one or more servers, such as a gaming establishment promotional server, for any promotional funds available to the player. In this embodiment, the one or more servers transfer data associated with any promotional funds available to the player to the mobile device application (or a server maintained account associated with the mobile device application).

In another such embodiment of communicating data associated with promotional funds, such as an electronic or virtual promotional ticket, to the mobile device application (or a server maintained account associated with the mobile device application), one or more servers, such as a gaming establishment promotional server, send a message to the mobile device application to associate the mobile device application with promotional funds, such as one or more electronic or virtual promotional tickets. Such a message could be sent via email, text, tcp/ip or other suitable networking technology that communicates the promotional funds, such as the electronic or virtual promotional ticket and/or information associated with the electronic promotional ticket (e.g., an amount of promotional credits, a promotional ticket identifier, and/or a time window which the electronic promotional ticket may be redeemed) to the mobile device application (or a server maintained account associated with the mobile device application).

In another such embodiment of communicating data associated with promotional funds, such as an electronic or virtual promotional ticket, to the mobile device application (or a server maintained account associated with the mobile device application), when the mobile device application is activated or launched by a player, the mobile device application queries one or more servers, such as a gaming establishment promotional server, for any promotional funds, such as any electronic or virtual promotional tickets, available to the player. That is, in certain embodiments, following the launching of the mobile device application, such as following the player selecting an image associated with an electronic casino loyalty account card stored via a digital wallet application or following the mobile device application retrieving data associated with a player account stored via a digital wallet application, the system determines if any promotional funds are to be transferred to the EGM facilitated by the mobile device application. In this embodiment, if the server determines that promotional funds are available for the player, such as one or more electronic or virtual promotional tickets are available for the player and/or an amount of promotional funds are associated with the player's account, the server transfers data associated with any promotional funds available to the player to the mobile device application (or a server maintained account associated with the mobile device application).

In another such embodiment of communicating data associated with promotional funds, such as an electronic or virtual promotional ticket, to the mobile device application (or a server maintained account associated with the mobile device application), when the mobile device and/or mobile device application detects that the mobile device is located in a gaming establishment associated with the mobile device application, the mobile device application queries one or more servers, such as a gaming establishment promotional server, for any promotional funds, such as any electronic or virtual promotional tickets, available to the player and/or an amount of promotional funds associated with the player's account. In this embodiment, if the server determines that promotional funds are available for the player, such as one or more electronic or virtual promotional tickets are available and/or an amount of promotional funds are associated with the player's account, the server transfers data associated with any promotional funds available to the player to the mobile device application (or a server maintained account associated with the mobile device application).

It should be appreciated that in certain of these embodiments of communicating data associated with promotional funds, such as an electronic or virtual promotional ticket, to the mobile device application, the promotional funds, such as the electronic or virtual promotional tickets, are stored by the mobile device in association with the mobile device application. For example, data communicated to the mobile device application includes the electronic promotional ticket which is redeemable at the EGM via the mobile device application. In other embodiments of communicating data associated with promotional funds, such as an electronic or virtual promotional ticket, to the mobile device application, the promotional funds, such as the electronic or virtual promotional tickets, are stored by one or more servers, such as a gaming establishment promotional server, but viewable via the mobile device application. For example, the electronic promotional ticket reside on the server, such as a gaming establishment promotional server, and the data communicated to the mobile device application includes identifying information associated the electronic promotional ticket (e.g., an amount of promotional credits, a promotional ticket identifier, and/or a time window which the electronic promotional ticket may be redeemed). Accordingly, in each of these embodiments, the mobile device stores, in association with the mobile device application, data associated with promotional funds, such as one or more electronic promotional tickets, to replace the use of and certain downsides or disadvantages associated with paper promotional tickets.

Following the mobile device application obtaining data associated with promotional funds, such as an electronic or virtual promotional ticket, to the mobile device application, the promotional funds, such as the electronic or virtual promotional tickets, are accessible by the mobile device in association with the mobile device application. That is, as described above in relation to how funds are facilitated to be transferred from a mobile device to an EGM via the mobile device application, promotional funds, such as one or more electronic promotional tickets (or promotional credits associated with such electronic promotional tickets), are viewable via the mobile device application and transferable from the mobile device to the EGM via the mobile device application.

It should be appreciated that the utilization of a mobile device to transfer one or more of the above-described funds to the EGM reduces the costs associated with utilizing cash, ticket vouchers and/or promotional tickets. For example, the utilization of cash and ticket vouchers is associated with the labor costs of having to periodically remove a cash box including received ticket vouchers and cash from the EGM, replace the removed cash box with an empty one and refill the blank ticket voucher stacks housed by the EGM. The utilization of such cash and ticket vouchers is further associated with the various labor costs of counting the cash and ticket vouchers removed from the EGM. Specifically, any removed cash is transported to a secure area where one or more individuals are involved in counting and recording the various sums of cash and/or ticket vouchers removed from each EGM. The cash amounts removed from each EGM are reconciled with other information sources, such as from hard meters on the EGM or records from a server that generates and validates ticket vouchers. The reconciliation process ensures the earnings from the EGM are properly taxed. Additionally, the utilization of promotional tickets is associated with the various costs of printing such promotional tickets, mailing such promotional tickets to players prior to such players visiting the gaming establishment and/or staffing a player service desk with personal to redeem such promotional tickets. The utilization of a wirelessly connected mobile device to facilitate one or more requested actions as described herein reduces or eliminates these various costs associated with utilizing cash, ticket vouchers and/or promotional tickets.

Securing Transactions Between Mobile Device and EGM

While the facilitation of the transfer of funds to and from an EGM via a mobile device has many advantages described herein, certain security concerns arise when transferring fund data wirelessly between an EGM and a mobile device (or between an EGM and the mobile device via one or more servers). For example, a malicious person may attempt to intercept such a wireless communication and steal the funds being transferred. Such a malicious person may devise electronics, such as an antenna or other electronics placed on or near the EGM to insert their mobile device between a "cash out" input and the mobile device engaging the EGM.

More specifically, when facilitating the transfer of deposited funds and/or an amount of winnings from the EGM to a cashless wagering account via the mobile device application, a player initiates an engagement of the EGM with the mobile device, such as tapping the mobile device to a player tracking card reader or other designated location(s) of the EGM (or a component of the EGM). However, before the engagement of the EGM with the player's mobile device is complete, an intruder utilizes such devised electronics to beat the player to the completion of the engagement. In this example, when the player subsequently actuates a "cash out" button on the EGM, the EGM (or a component of the EGM) proceeds with transferring the amount of the credit balance of the mobile device of the intruder. Such a concern is also present when a player attempts to wirelessly transfer funds to an EGM via a mobile device wherein the intruder device intercepts such a transfer and reroutes the funds to the mobile device of the intruder.

In view of these security concerns, certain embodiments of the present disclosure utilize a time window, such as ten seconds, in association with one or more requested actions. In one such embodiment, after receiving an initiation of an engagement of the EGM with the mobile device, the EGM (or a component of the EGM) assigns or otherwise associates a time window with such an engagement. If one mobile device is attempted to be paired with the EGM within the associated time window before an action is requested, the EGM determines that only one mobile device is communicating with the EGM and the EGM proceeds with executing the requested action, such as a requested fund transfer as described herein. On the other hand, if more than one mobile device is attempted to be paired with the EGM within the associated time window before an action is requested, the EGM determines that an intruder device may be present. In such a situation, the EGM cancels the requested action and/or prompts the player to reengage the EGM with the mobile device.

In another such embodiment, after receiving a requested action from the mobile device, the EGM assigns or otherwise associates a time window with such a requested action. Following the requested action, if one mobile device is attempted to be paired with the EGM within the associated time window, the EGM determines that only one mobile device is communicating with the EGM and the EGM proceeds with executing the requested action, such as a requested fund transfer as described herein. On the other hand, following the requested action, if more than one mobile device is attempted to be paired with the EGM within the associated time window, the EGM determines that an intruder device may be present. In such a situation, the EGM cancels the requested action and/or prompts the player to reengage the EGM with the mobile device.

It should be appreciated that in addition to thwarting an isolated attempt by an intruder to intercept a wireless fund transfer, the system is configured to identify if a device is involved in multiple attempted engagements with an EGM over a designated threshold or time window. In this embodiment, such a device may be prohibited from being involved in further wireless fund transfers. For example, if multiple engagements are detected involving a single device within a twenty-four hour period, then that mobile device could be banned from participating in any future engagements. Alternatively, that device could be prevented from participating in engagements for a designated period of time, such as a cooling-off period.

Mobile Device/EGM Communications

As indicated above, in various embodiments, the insertion and removal of an electronic player tracking card (i.e., the logging in and logging out of the player from the player tracking system), and/or the facilitation of the transfer of funds between a cashless wagering account maintained for a player and an EGM is accomplished by one or more wireless communication protocols between the EGM and the mobile device.

In certain embodiments, the communication with the mobile device can occur through one or more wireless interfaces of the EGM. Such wireless interfaces are configured to receive information, such as information associated with one or more accounts and instructions to initiate a transfer of funds to and from a cashless wagering account and the EGM utilizing a mobile device.

In one embodiment, the wireless interface is integrated into the cabinet of the EGM and the EGM processor is configured to communicate directly with and send control commands to the wireless interface. In another embodiment, the wireless interface is integrated into a device mounted to and/or within the EGM cabinet, such as a player tracking unit or a player identification device of a player tracking unit. In certain embodiments where the wireless interface is embedded in a secondary device, such as a player tracking unit, the EGM processor sends control commands to control the wireless interface via a secondary controller, such as a player tracking controller.

In certain embodiments disclosed herein, the wireless interface implements a near field communication (NFC) protocol to facilitate the insertion and removal of an electronic player tracking card (i.e., the logging in and logging out of the player from the player tracking system) and/or the transfer of funds between a cashless wagering account maintained for a player and an EGM.

NFC is typically used for communication distances of 4 cm or less. NFC, enables for simplified transactions, data exchange, and connections with a touch. Formed in 2004, the Near Field Communication Forum (NFC Forum) promotes sharing, pairing, and transactions between NFC devices and develops and certifies device compliance with NFC standards. NFC's short range helps keep encrypted identity documents private. Thus, as described above, a tap of a mobile device with an NFC chip to an EGM can cause a transfer of funds to an EGM and/or serve as keycard or ID card for a loyalty program.

Figure 3A:
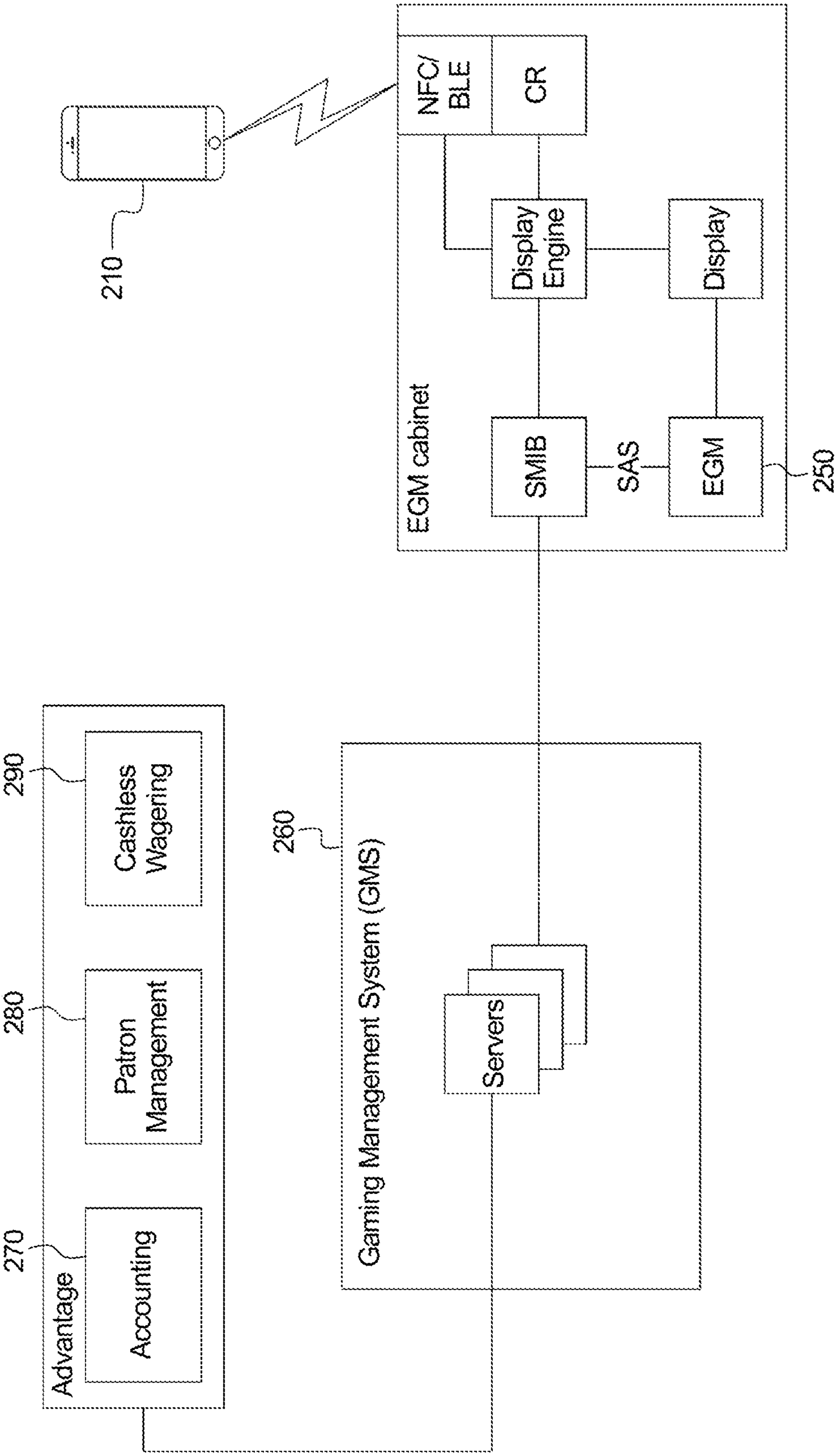
FIGS. 3A, and 3B are example wireless configurations of the system of the present disclosure.

As seen in FIG. 3A, utilizing an NFC implementation, the mobile device 210 communicates with the EGM 250 via an NFC protocol. As seen in FIG. 3A, the EGM housing (which includes the EGM 250 and various system components) operates with a gaming establishment management system 260 which operates with one or more servers, such as one or more accounting servers 270, patron management servers 280 and cashless wagering servers 290.

In certain embodiments which utilize the NFC implementation, the mobile device application registers a mobile device application with one or more processors of the mobile device. In these embodiments, when the mobile device is detected by an NFC reader of a component of a gaming establishment management system located inside the EGM, such as a NexGen® player tracking component of an IGT Advantage® system, the component of the gaming establishment management system located inside the EGM communicates one or more data messages to the mobile device (or to one or more servers which then communicate such data messages to the mobile device). Such data messages are commands generated by the component of the gaming establishment management system located inside the EGM when the mobile device is detected in the NFC reader field. The processor of the mobile device communicates the data message to the mobile device application. The mobile device application responds, such as communicating a triggering message, and a communication channel is opened between the component of the gaming establishment management system located inside the EGM and the mobile device application (or between the component of the gaming establishment management system located inside the EGM, one or more servers and the mobile device application). This open communication channel enables the component of the gaming establishment management system located inside the EGM to send, though the NFC reader, additional data messages to the mobile device (or to the mobile device via one or more servers) which are responded to by the mobile device application of the mobile device.

It should be appreciated that as long as the mobile device remains within the NFC field, the component of the gaming establishment management system located inside the EGM is configured to communicate with the mobile device and send data, such as status updates, as necessary. However, once the mobile device is removed from the NFC field, the communication channel is closed and such status updates must be discontinued.

In various embodiments, the component of the gaming establishment management system located inside the EGM is configured to communicate other commands to the mobile device. Such commands and/or messages include one or more of: (i) a Card Inserted message which confirms that the player is logged into the player tracking system (e.g., an electronic player tracking card is associated with the EGM); (ii) a Card Removed message which confirms that the player is logged out of the player tracking system (e.g., an electronic player tracking card is removed or no longer associated with the EGM); (iii) a New Card Scanned message which reports that a physical card is detected in the player tracking card reader; (iv) a PIN Status message which reports a personal identification number verification status; (v) a Transfer Status message which reports a transfer request status; (vi) a Balance Status message which reports a balance request status; and (vii) a Disconnect message which informs the mobile device application to drop the connection with the EGM, such as when the EGM cashout button is pressed, when the gaming system determines that the player card is "abandoned" or when the EGM credit balance reaches zero and remains at zero for a designated period of time, such as thirty seconds.

In other embodiments, the wireless interface implements a Wi-Fi, cellular and/or Bluetooth™ communications protocol to facilitate the insertion and removal of an electronic player tracking card (i.e., the logging in and logging out of the player from the player tracking system) and/or the transfer of funds between a cashless wagering account maintained for a player and an EGM.

In such embodiments, Bluetooth™ pairing occurs when two Bluetooth devices agree to communicate with each other and establish a connection. In order to pair two Bluetooth wireless devices, a password (passkey) is exchanged between the two devices. The Passkey is a code shared by both Bluetooth devices, which proves that both users have agreed to pair with each other. After the passkey code is exchanged, an encrypted communication can be set up between the pair devices. In Wi-Fi paring, every pairing can be set up with WPA2 encryption or another type of encryption scheme to keep the transfer private. Wi-Fi Direct is an example of a protocol that can be used to establish point-to-point communications between two Wi-Fi devices. The protocol enables for a Wi-Fi device pair directly with another without having to first join a local network.

Figure 3B:
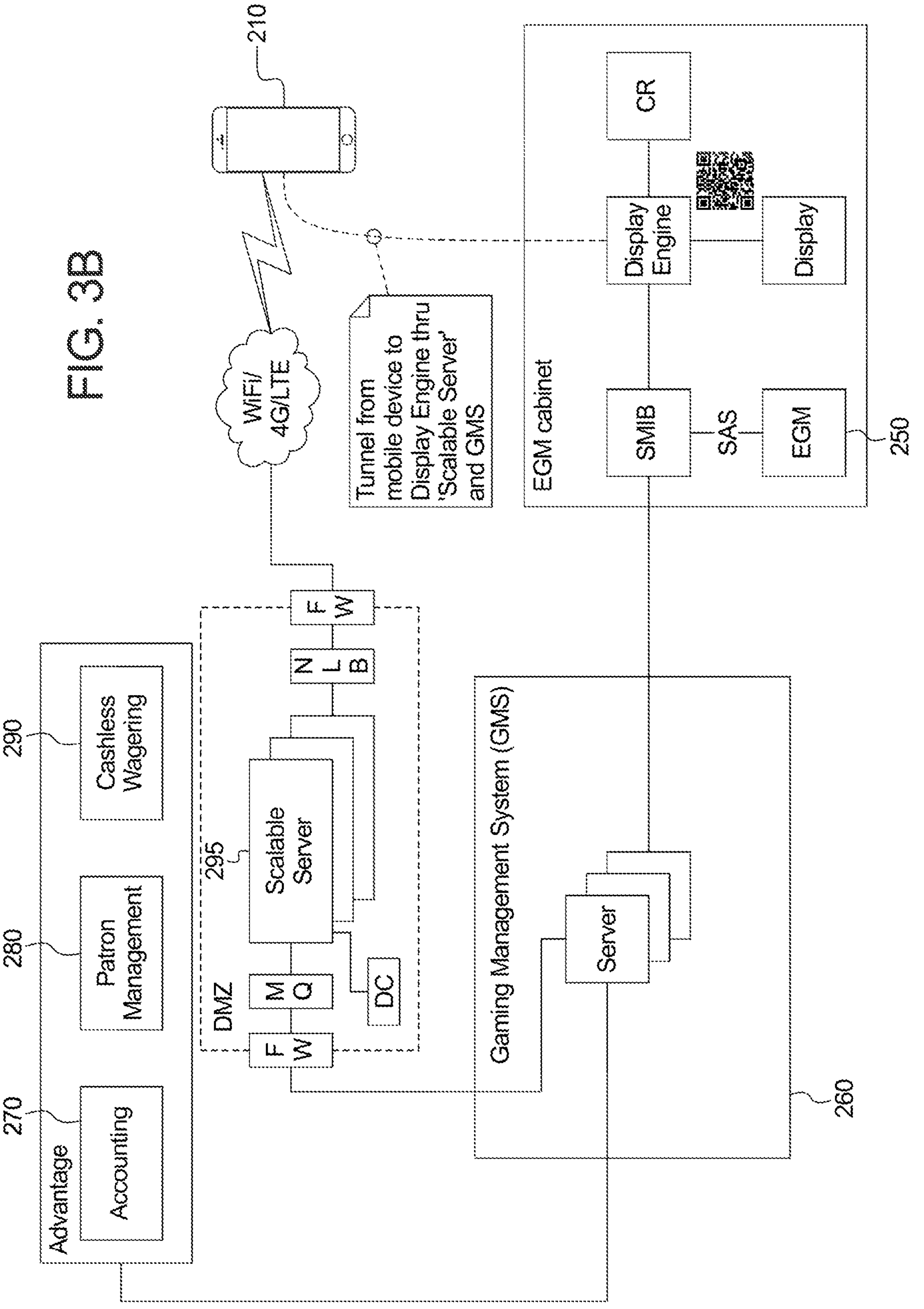

As seen in FIG. 3B, utilizing an a Wi-FiBluetooth™ communications protocol implementation, the mobile device 210 communicates with the EGM 250 via a Wi-FiBluetooth™ communications protocol. As seen in FIG. 3B, the EGM housing (which includes the EGM 250 and various system components) operates with a gaming establishment management system 260 which operates with one or more servers, such as one or more accounting servers 270, patron management servers 280 and cashless wagering servers 290.

It should be appreciated that Wi-Fi, cellular or Bluetooth™ communication protocols can be used in lieu of or in combination with NFC. For instance, an NFC communication can be used to instantiate a Wi-Fi or Bluetooth™ communication between the EGM, zero, one or more servers and a mobile device, such as secure pairing using one of these protocols. That is, in one embodiment, an NFC interface on an EGM can be used to set-up a higher speed communication between the EGM, zero, one or more servers and the NFC enabled mobile device. The higher speed communication rates can be used for expanded content sharing. For instance, a NFC and Bluetooth enabled EGM can be tapped by an NFC and Bluetooth enabled mobile device for instant Bluetooth pairing between the devices and zero, one or more servers. Instant Bluetooth pairing between an EGM, an NFC enabled mobile device and zero, one or more servers, can save searching, waiting, and entering codes. In another example, an EGM can be configured as an NFC enabled router, such as a router supporting a Wi-Fi communication standard. Tapping an NFC enabled mobile device to an NFC enabled and Wi-Fi enabled EGM can be used to establish a Wi-Fi connection between the devices and zero, one or more servers.

In certain embodiments which implement a Wi-Fi, cellular and/or Bluetooth™ communications protocol, the gaming system utilizes one or more QR codes generated by the EGM to facilitate the communication of data between the mobile device and the gaming system. In such embodiments, the QR code is used to identify the EGM that is displaying the QR code to identify the server to which the mobile device should connect. It should be appreciated that the QR code enables the gaming system to establish a secure tunnel or path from the mobile device to the gaming establishment's Wi-Fi network and then to the gaming establishment's wired network and finally to the EGM. In these embodiments, a communication tunnel wrapper (i.e., a Wi-FiBluetooth™ tunnel wrapper) is utilized to establish a connection between the gaming system and the mobile device and to transport any data messages described herein between the EGM, zero, one or more servers and the mobile device.

More specifically, in certain embodiments, the player requests, via an input at the EGM and/or the mobile device, the generation of a QR code by the EGM. In response to the player's request, the EGM or a player tracking unit displays a QR code. In certain embodiments, the QR code includes a nonce which prevents a third-party (e.g., another player) from sniping the player's login attempt. Such an on-demand QR code remains valid for a designated amount of time such that if the player does not scan the QR code within the designated amount of time, another QR code is necessary to be scanned to connect the mobile device to the EGM.

Figure 2F:
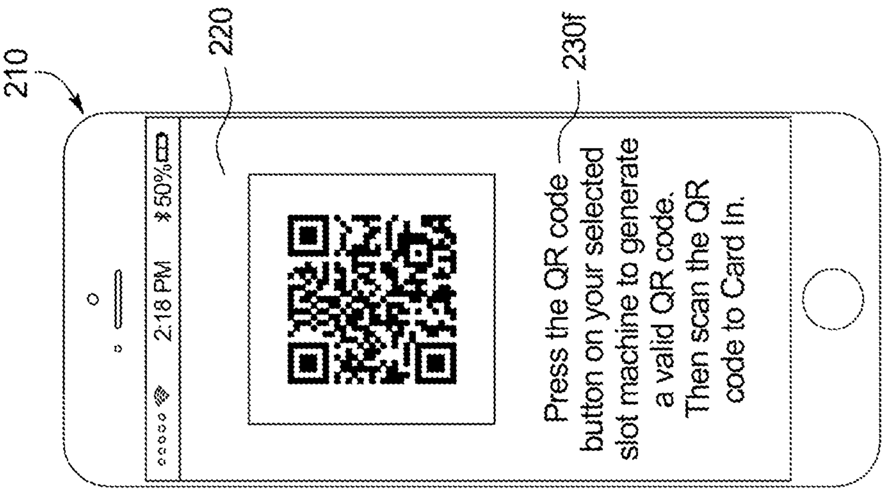
Figure 2E:
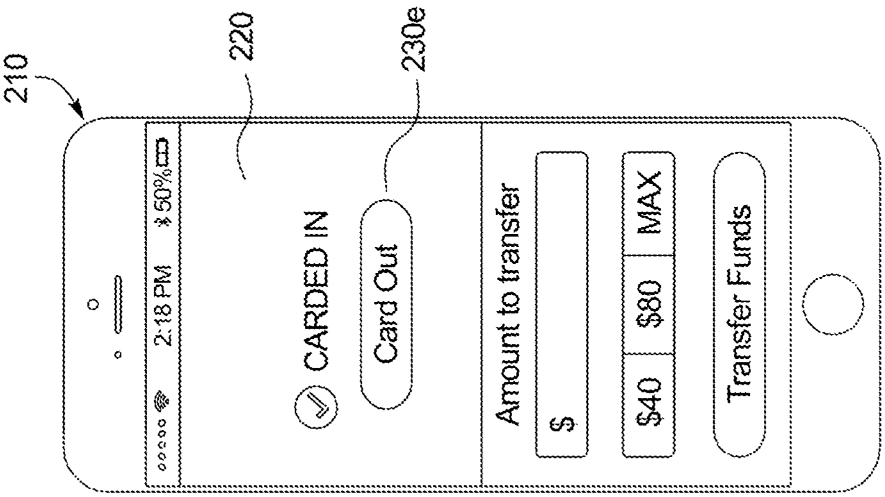
Figure 2D:
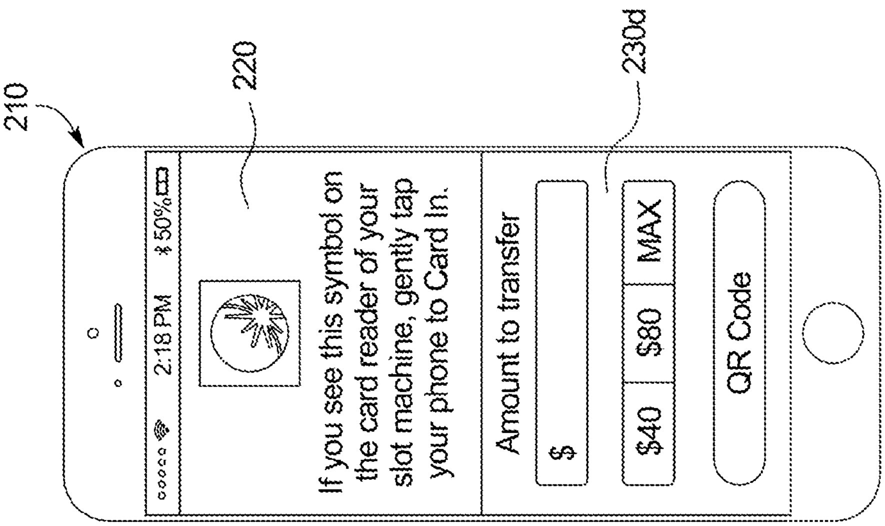

In these embodiments, as seen in FIG. 2F, the player scans the QR code with the mobile device application. If the gaming system determines that the QR code is valid (i.e., not expired), the mobile device application will connect to the gaming system. It should be appreciated that as long as the established connection between the mobile device and the gaming system remains active, one or more gaming system servers and mobile device may communicate data, such as status updates, as necessary. It should be further appreciated that in association with the Wi-Fi or Bluetooth™ or mobile device network communications protocol described herein, any action requested by the player via the mobile device application does not require a new engagement between the mobile device and the EGM, such as a new scanning of the QR code to send such a requested action from the mobile device to the EGM (or to send a requested action from the mobile device to one or more servers and then from one or more servers to the EGM).

In certain embodiments, following the scanning of a valid QR code, the mobile device application connects to one or more servers. Such servers use websockets secured with a transport layer security protocol or other similar mechanisms. In one such embodiment, the servers operate with one or more translators and zero, one or more components of the gaming system, similarly using websockets secured with a transport layer security protocol, to communicate data to the EGM or a component of the EGM. It should be appreciated that in certain embodiments, one or more of the servers are scalable servers configured to scale to accept connections from thousands of mobile devices.

In certain embodiments, after establishing a connection with one or more servers, the mobile device application transmits a connect command to the gaming system. In response to receiving a connect command from the mobile device, the gaming system sends a message to the mobile device. This message serves to encapsulate various commands between the gaming system and the mobile device. In these embodiments, if the mobile device application does not receive this message within a designated period of time, such as within five seconds, the mobile device application displays an error message to the player and directs the player to rescan the QR code.

In addition to the connect command communicated from the mobile device application to the gaming system, the mobile device application of these embodiments is configured to send a disconnect command to the gaming system. Such a disconnect command functions to tear-down the connection the server. That is, after the server receives the disconnect command from the mobile device application, the server sends this disconnect command to the translator and close the websocket to the mobile device application. In these embodiments, if the websocket is not closed or otherwise terminated within a designated period of time, such as five seconds, the mobile device application may retry communicating this command or close the websocket. It should be appreciated that if the mobile device connection is severed before this command is received by the gaming system, the sever sends this command on behalf of the mobile device application;

In another embodiment, the mobile device application is configured to send a trigger command to the gaming system, such as a component of the gaming establishment management system located inside the EGM. In this embodiment, the trigger command is associated with an action requested by the player, such as a transfer of funds to or from the EGM. In such embodiments, when the gaming system receives the trigger command from the mobile device application, the gaming system will communicate the appropriate requests to the mobile device application. If the mobile device application does not receive these requests within a designated amount of time, such as five seconds, the mobile device application will display an error message to the player and enable the player to retry the requested action.

In other embodiments, the mobile device application communicates with the gaming system through a tunnel established over the mobile device's Wi-FI network or the mobile device's network connection. In such embodiments, the mobile device application will connect to one or more gaming system servers which use websockets secured with a transport layer security protocol. The gaming system server operates with one or more translators, similarly using websockets secured with a transport layer security protocol to communicate data to the EGM or a component of the EGM.

In certain embodiments which utilize the NFC communication protocol described herein, which utilize the Wi-Fi, cellular and/or Bluetooth™ communication protocols described herein and/or which utilize any other communication protocol described herein, any action requested by the player via the mobile device application requires a new engagement between the mobile device and the EGM, such as a new tap of the mobile device to a card reader or other designated location(s) of the EGM. In certain other embodiments which utilize the NFC communication protocol described herein, which utilize the Wi-Fi, cellular and/or Bluetooth™ communication protocols described herein and/or which utilize any other communication protocol described herein, certain actions requested by the player via the mobile device application requires a new engagement between the mobile device and the EGM, such as a new tap of the mobile device to a card reader or other designated location(s) of the EGM and other actions requested by the player via the mobile device application do not require any new engagement between the mobile device and the EGM.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, the term "EGM" is used herein to refer to an electronic gaming machine (such as a slot machine, a video poker machine, a video lottery terminal (VLT), a video keno machine, or a video bingo machine located on a casino floor). Additionally, for brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link In certain such embodiments, the EGM (or personal gaming device) is configured to communicate with another EGM (or personal gaming device) through the same data network or remote communication link or through a different data network or remote communication link.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the data network is a WAN, the gaming system includes a central server, central controller, or remote host and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server".

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 4:
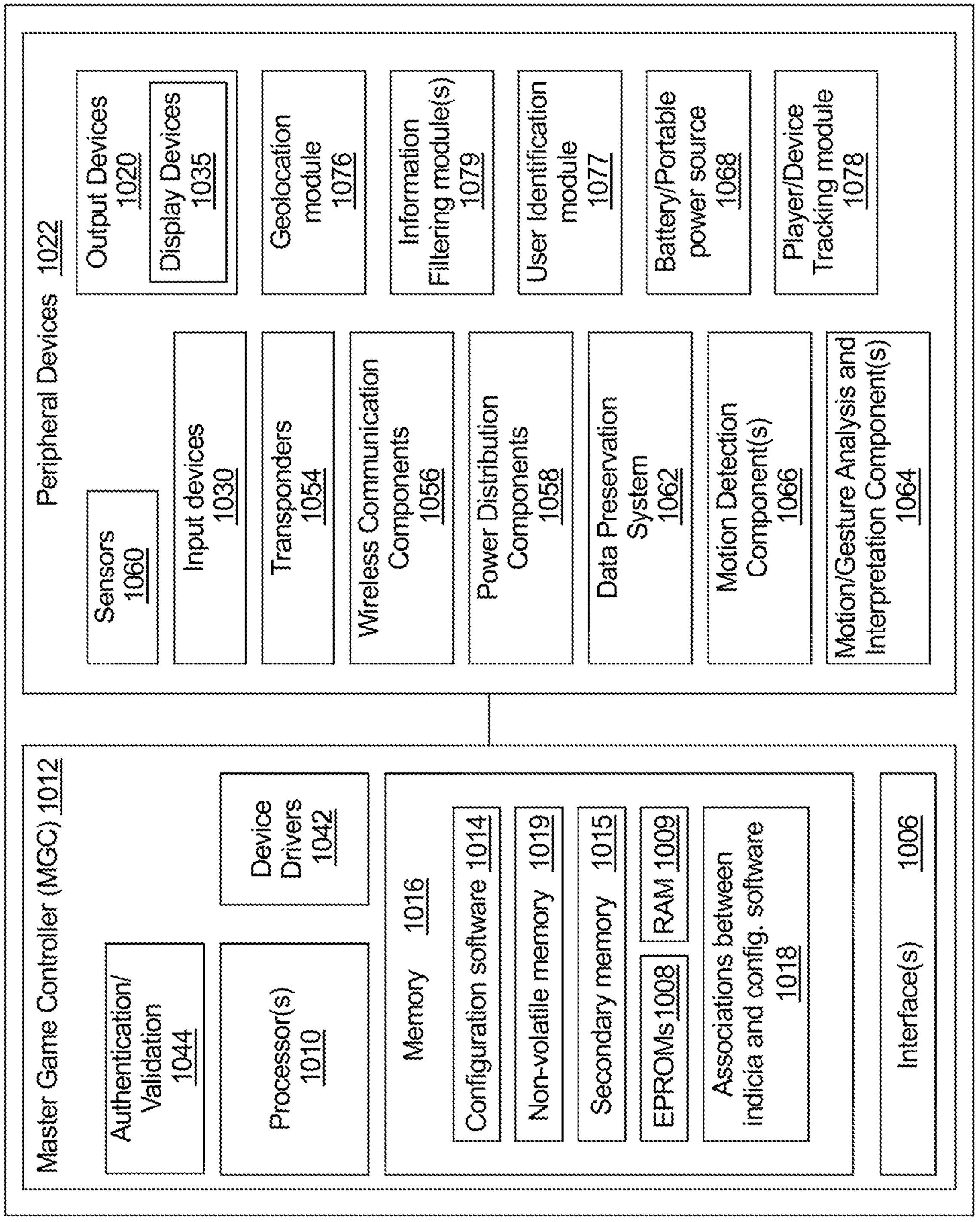
FIG. 4 is a schematic block diagram of one embodiment of an electronic configuration of an example gaming system disclosed herein.
Figure 5A:
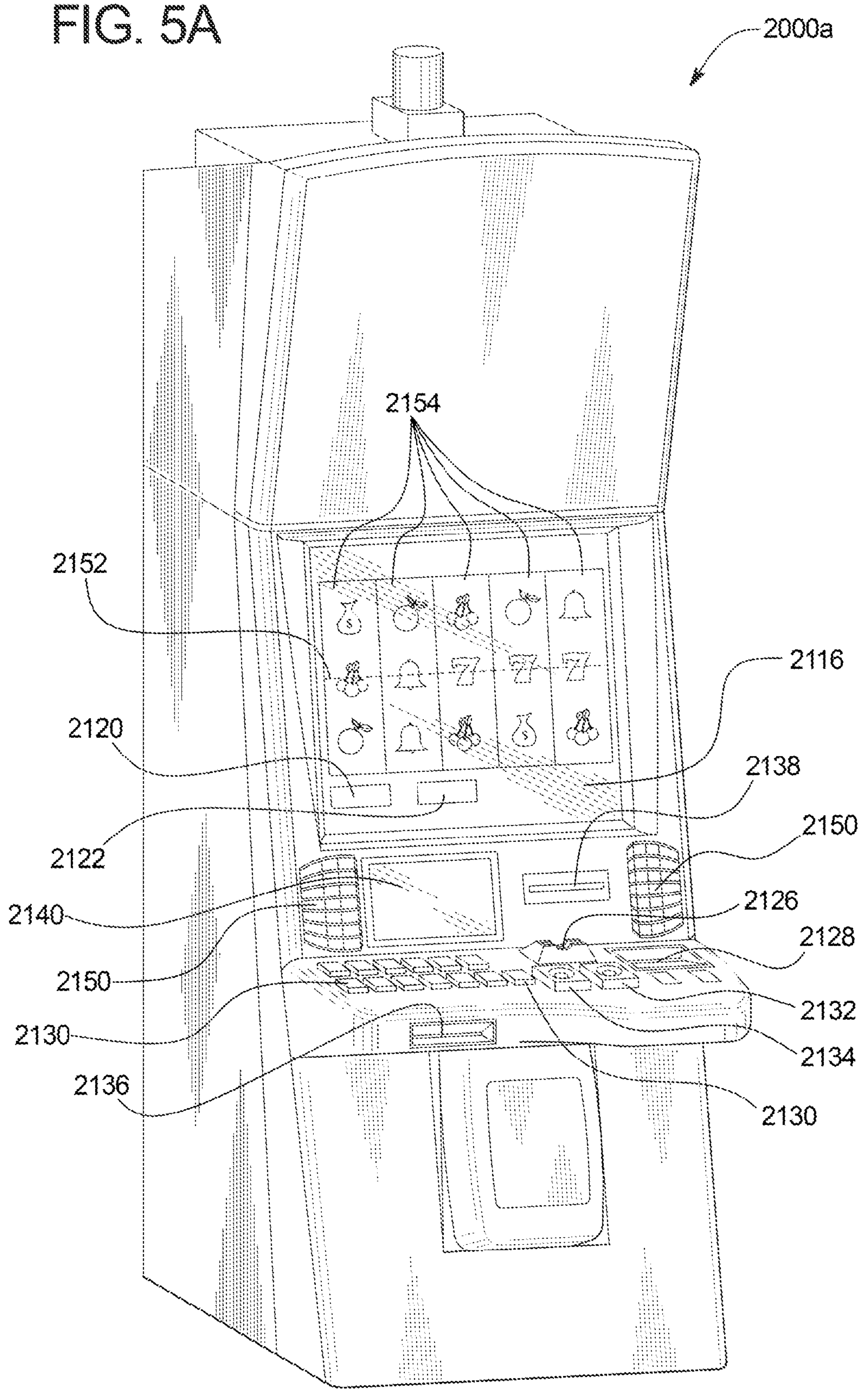
FIGS. 5A and 5B are perspective views of example alternative embodiments of the gaming system disclosed herein.
Figure 5B:
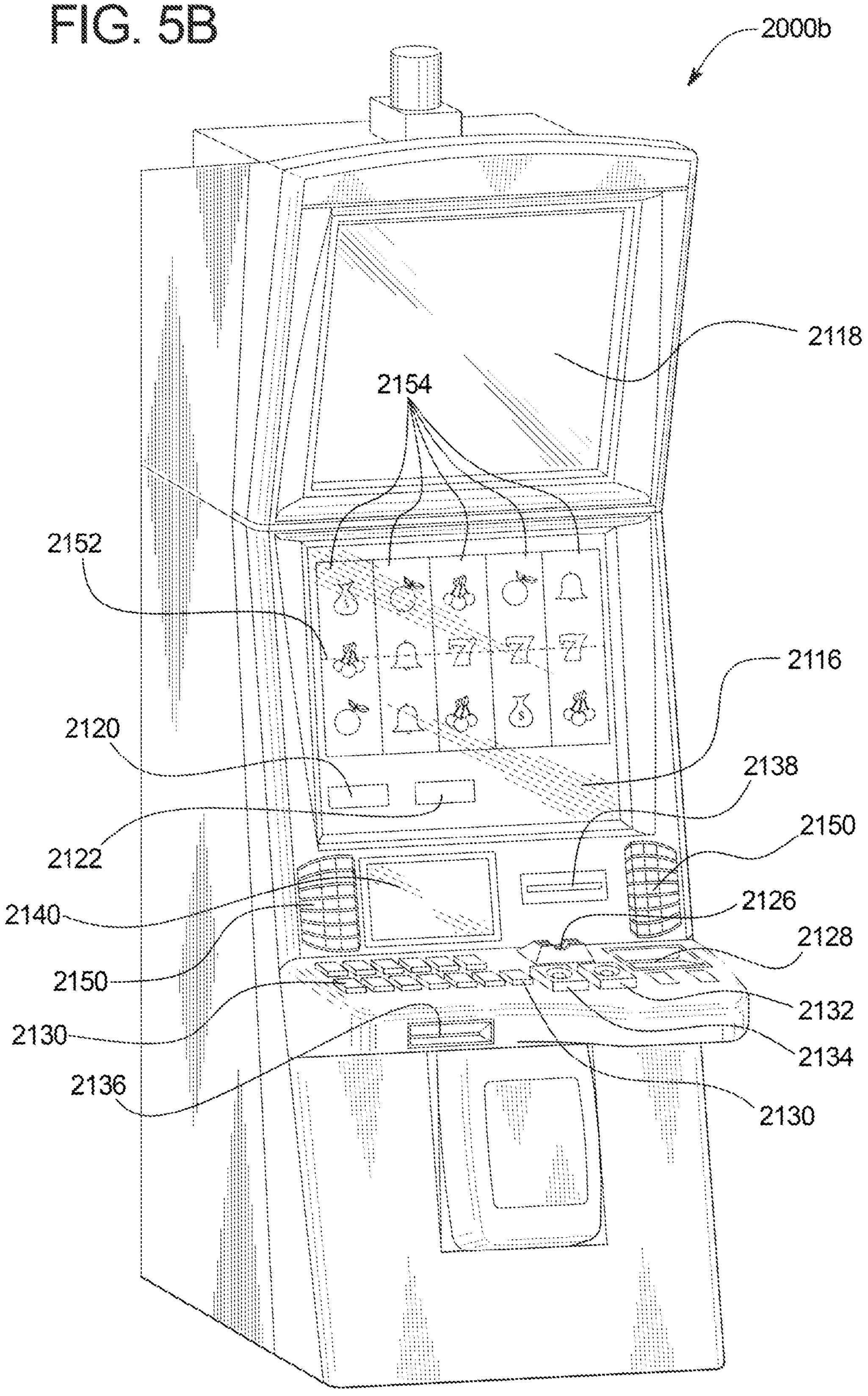

FIG. 4 is a block diagram of an example EGM 1000 and FIGS. 5A and 5B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices may includes some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets".

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 5A includes a central display device 2116, a player tracking display 2140, a credit display 2120, and a bet display 2122. The example EGM 2000*b* illustrated in FIG. 5B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 5A and 5B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; and U.S. Pat. No. 6,048,269, entitled "Coinless Slot Machine System and Method".

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine".

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 5A and 5B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 5A and 5B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine". When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 5A and 5B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero)

credit balance, the EGM initiates a payout associated with the player's credit balance. The example EGMs 2000*a* and 2000*b* illustrated in FIGS. 5A and 5B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 5A and 5B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 5A and 5B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 5A and 5B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 5A and 5B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game".

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern".

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services".

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electromechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 5B includes a payline 1152 and a plurality of reels 1154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations".

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards".

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game (s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win".

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services".

Web-Based Gaming

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination (or in any other manners described above.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer or by initiating creation of a paper check that is mailed to the player.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area. Examples of tethering an EGM to a personal gaming device and geo-fencing are described in U.S. Patent Appl. Pub. No. 2013/0267324, entitled "Remote Gaming Method Allowing Temporary Inactivation Without Terminating Playing Session Due to Game Inactivity".

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes".

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play".

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification".

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment".

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System".

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention is claimed as follows:

1. A system comprising:

a processor; and a memory device that stores a plurality of instructions that, when executed by the processor responsive to a limit being imposed in association with a first gaming establishment account maintained by a first server, cause the processor to communicate data associated with the imposed limit, wherein responsive to a second server that separately maintains a second gaming establishment account receiving the data, the second server synchronizes the second gaming establishment account with the first gaming establishment account by imposing the limit on the second gaming establishment account.

2. The system of claim 1, wherein the limit comprises at least one of a limitation on an amount of total withdrawals over a designated period of time and a limitation on an amount of total deposits over the designated period of time.

3. The system of claim 1, wherein the limit comprises at least one of a limitation on an amount of total withdrawals in association with a single transaction and a limitation on an amount of total deposits in association with the single transaction.

4. The system of claim 1, wherein the limit comprises at least one a limitation on an amount of total withdrawals in association with a funding source, and a limitation on an amount of total deposits in association with funding source.

5. The system of claim 1, wherein the limit comprises at least one of a limitation on an amount of withdrawals associated with a gaming activity and a limitation on an amount of deposits associated with the gaming activity.

6. The system of claim 1, wherein the limit comprises at least one of a limitation on an amount of withdrawals associated with a non-gaming activity, and a limitation on an amount of deposits associated with the non-gaming activity.

7. The system of claim 1, wherein one of the first gaming establishment account and the second gaming establishment account comprises a first cashless wagering account.

8. The system of claim 7, wherein the other one of the first gaming establishment account and the second gaming establishment account comprises one of a second cashless wagering account and a gaming establishment retail account.

9. A system comprising:

a processor; and a memory device that stores a plurality of instructions that, when executed by the processor responsive to an occurrence of an event associated with a first gaming establishment account maintained by a first server, cause the processor to communicate data associated with the occurrence of the event, wherein responsive to a second server that separately maintains a second gaming establishment account receiving the data, the second server synchronizes the second gaming establishment account with the first gaming establishment account by modifying a state of the second gaming establishment account.

10. The system of claim 9, wherein the modified state of the second gaming establishment account comprises one of an enabled state and a disabled state.

11. The system of claim 9, wherein the modified state of the second gaming establishment account comprises one of a locked state and an unlocked state.

12. The system of claim 9, wherein the modified state of the second gaming establishment account comprises one of a state indicating where funds of the second gaming establishment account can be used, and a state indicating how funds of the second gaming establishment account can be used.

13. A method of operating a system, the method comprising:

responsive to a limit being imposed in association with a first gaming establishment account maintained by a first server, communicating data associated with the imposed limit, and responsive to a second server that separately maintains a second gaming establishment account receiving the data, causing, by a processor, a synchronization of the second gaming establishment account with the first gaming establishment account by imposing the limit on the second gaming establishment account.

14. The method of claim 13, wherein the limit comprises at least one of a limitation on an amount of total withdrawals over a designated period of time and a limitation on an amount of total deposits over the designated period of time.

15. The method of claim 13, wherein the limit comprises at least one of a limitation on an amount of total withdrawals in association with a single transaction and a limitation on an amount of total deposits in association with the single transaction.

16. The method of claim 13, wherein the limit comprises at least one a limitation on an amount of total withdrawals in association with a funding source, and a limitation on an amount of total deposits in association with funding source.

17. The method of claim 13, wherein the limit comprises at least one of a limitation on an amount of withdrawals associated with a gaming activity and a limitation on an amount of deposits associated with the gaming activity.

18. The method of claim 13, wherein the limit comprises at least one of a limitation on an amount of withdrawals associated with a non-gaming activity, and a limitation on an amount of deposits associated with the non-gaming activity.

19. The method of claim 13, wherein one of the first gaming establishment account and the second gaming establishment account comprises a first cashless wagering account.

20. The method of claim 19, wherein the other one of the first gaming establishment account and the second gaming establishment account comprises one of a second cashless wagering account and a gaming establishment retail account.

* * * * *